(12) United States Patent
Evans, Jr. et al.

(10) Patent No.: US 9,988,760 B2
(45) Date of Patent: Jun. 5, 2018

(54) MODULAR CARPET SYSTEMS

(75) Inventors: Paul D. Evans, Jr., Sugar Valley, GA (US); Gabe Moore, Acworth, GA (US)

(73) Assignee: Tandus Centiva Inc., Dalton, GA (US)

( * ) Notice: Subject to any disclaimer, the term of this patent is extended or adjusted under 35 U.S.C. 154(b) by 858 days.

(21) Appl. No.: 13/463,194

(22) Filed: May 3, 2012

(65) Prior Publication Data

US 2012/0282459 A1 Nov. 8, 2012

Related U.S. Application Data

(60) Provisional application No. 61/482,336, filed on May 4, 2011, provisional application No. 61/505,160, filed on Jul. 7, 2011.

(51) Int. Cl.
*B32B 3/06* (2006.01)
*C09J 7/02* (2006.01)
*D06N 7/00* (2006.01)
*A47G 27/04* (2006.01)

(52) U.S. Cl.
CPC ....... *D06N 7/0071* (2013.01); *A47G 27/0475* (2013.01); *D06N 2209/1628* (2013.01); *Y10T 428/26* (2015.01); *Y10T 428/2852* (2015.01)

(58) Field of Classification Search
None
See application file for complete search history.

(56) References Cited

U.S. PATENT DOCUMENTS

| | | | |
|---|---|---|---|
| 406,866 A | 7/1889 | Atwater |
| 833,571 A | 10/1906 | Bailey |
| 1,158,051 A | 10/1915 | Hopkinson |
| 1,661,037 A | 3/1924 | Gammeter |
| 1,685,362 A | 9/1928 | Joseph |
| 1,711,149 A | 4/1929 | Joseph |
| 2,250,669 A | 7/1941 | Jamgotchian |
| 2,367,536 A | 1/1945 | Spitzli |
| 2,522,114 A | 5/1949 | Reinhard |
| 2,607,711 A | 8/1952 | Hendricks |
| 2,647,850 A | 8/1953 | Reinhard |
| 2,702,919 A | 3/1955 | Judge |
| 2,709,826 A | 6/1955 | Reinhard |
| 2,726,419 A | 12/1955 | Saks et al. |
| 3,083,393 A | 4/1963 | Nappi |
| 3,120,083 A | 2/1964 | Dahlberg et al. |
| 3,241,662 A | 3/1966 | Robinson et al. |
| 3,271,217 A | 9/1966 | Mapson |
| 3,494,006 A | 2/1970 | Brumlik |
| 3,538,536 A | 11/1970 | Pecorella |
| 3,558,384 A | 1/1971 | Ronning |
| 3,558,385 A | 1/1971 | Ronning |
| 3,558,386 A | 1/1971 | Ronning |
| 3,579,941 A | 5/1971 | Tibbals |
| 3,696,459 A | 10/1972 | Kucera et al. |
| 3,712,845 A | 1/1973 | Hartung |
| 3,748,211 A | 7/1973 | Hoopengardner |
| 3,788,941 A | 1/1974 | Kupits |
| 3,819,773 A | 6/1974 | Pears |
| 3,858,269 A | 1/1975 | Sutton et al. |
| 3,928,690 A | 12/1975 | Settineri et al. |
| 3,969,564 A | 7/1976 | Carder |
| 4,010,301 A | 3/1977 | Anderson et al. |
| 4,012,544 A | 3/1977 | Richards |
| 4,114,346 A | 9/1978 | Kelly |
| 4,152,473 A | 5/1979 | Layman |
| 4,196,254 A | 4/1980 | Puskadi |
| 4,233,793 A | 11/1980 | Omholt |
| 4,242,389 A | 12/1980 | Howell |
| 4,268,566 A | 5/1981 | Ebert |
| 4,299,741 A | 11/1981 | Doehnert |
| 4,322,516 A | 3/1982 | Wiest et al. |
| 4,340,633 A | 7/1982 | Robbins, Jr. |
| 4,361,925 A | 12/1982 | Yamamoto et al. |
| 4,386,135 A | 5/1983 | Campbell et al. |
| 4,405,674 A | 9/1983 | Kyle |
| 4,412,877 A | 11/1983 | Vosburgh |
| 4,416,713 A | 11/1983 | Brooks |
| 4,443,505 A | 4/1984 | Ehrenfeld, Jr. |
| 4,489,115 A | 12/1984 | Layman et al. |
| 4,522,857 A | 6/1985 | Higgins |
| 4,546,024 A | 10/1985 | Brown |
| 4,557,774 A | 12/1985 | Hoopengardner |
| 4,561,232 A | 12/1985 | Gladden, Jr. et al. |
| 4,562,938 A | 1/1986 | Loder |
| 4,564,546 A | 1/1986 | Jones |
| 4,571,353 A | 2/1986 | Gable, Jr. |
| 4,571,363 A | 2/1986 | Culbertson et al. |
| 4,595,617 A | 6/1986 | Bogdany |

(Continued)

FOREIGN PATENT DOCUMENTS

AT 360217 B 12/1980
AU 2003265409 3/2004

(Continued)

OTHER PUBLICATIONS

Tesa, tesa(R) 50600 Standard product data sheet, 5-11-10.*
"Film." Merriam-Webster.com. Merriam-Webster, n. d. Web. 19 Sep. 2016.*
CAP Product Data Sheet, 7/06 <http://www.captape.com/documents/SC-4075.pdf>.*
International Search Report—PCT/US2012/036326, dated Aug. 27, 2012, Tandus Flooring, Inc.
Written Opinion—PCT/US2012/036326, dated Aug. 27, 2012, Tandus Flooring, Inc.
International Search Report—PCT/US2008/058361, dated Oct. 8, 2009, Interface, Inc.

(Continued)

*Primary Examiner* — Cheng Huang

(57) ABSTRACT

A modular carpet system includes a carpet tile and an adhesive. The carpet tile is operative for resisting deformation, even under adverse conditions. In some embodiments, the adhesive may comprise a silicone-based adhesive or a urethane-based adhesive.

44 Claims, No Drawings

(56) References Cited

U.S. PATENT DOCUMENTS

| | | |
|---|---|---|
| 4,599,265 A | 7/1986 | Esmay |
| 4,647,484 A | 3/1987 | Higgins |
| 4,680,209 A | 7/1987 | Zybko et al. |
| 4,695,493 A | 9/1987 | Friedlander et al. |
| 4,702,948 A | 10/1987 | Sieber-Gadient |
| 4,731,273 A | 3/1988 | Bonk et al. |
| 4,769,895 A | 9/1988 | Parkins |
| 4,822,658 A | 4/1989 | Pacione |
| 4,824,498 A | 4/1989 | Goodwin et al. |
| 4,849,267 A | 7/1989 | Ward et al. |
| 4,880,700 A | 11/1989 | Charmot et al. |
| 4,915,999 A | 4/1990 | Tillotson |
| 4,920,720 A | 5/1990 | LaBianca |
| 4,947,602 A | 8/1990 | Pollasky |
| 4,988,551 A | 1/1991 | Zegler |
| 4,993,590 A | 2/1991 | Windorski |
| 5,012,590 A | 5/1991 | Wagner et al. |
| 5,034,258 A | 7/1991 | Grace |
| 5,049,616 A | 9/1991 | Blizzard et al. |
| 5,018,235 A | 10/1991 | Stamatiou et al. |
| 5,082,705 A | 1/1992 | Rose |
| 5,096,764 A | 3/1992 | Terry et al. |
| 5,114,774 A | 5/1992 | Maxim, Jr. |
| 5,116,439 A | 5/1992 | Raus |
| 5,120,587 A | 6/1992 | McDermott, III et al. |
| 5,160,770 A | 11/1992 | Hoopengardner |
| 5,191,692 A | 3/1993 | Pacione |
| 5,205,091 A | 4/1993 | Brown |
| 5,217,522 A | 6/1993 | Riebel et al. |
| 5,217,552 A | 6/1993 | Miyajima et al. |
| 5,221,394 A | 6/1993 | Epple et al. |
| 5,254,407 A | 10/1993 | Sergerie et al. |
| 5,304,410 A | 4/1994 | Webster |
| 5,389,186 A | 2/1995 | Knockum |
| 5,401,547 A | 3/1995 | Blackwell et al. |
| 5,422,156 A | 6/1995 | Billarant |
| 5,438,809 A | 8/1995 | Ehrlich |
| 5,447,004 A | 9/1995 | Vrnak |
| 5,470,630 A | 11/1995 | Thompson |
| 5,522,187 A | 6/1996 | Bogaerts |
| 5,564,251 A | 10/1996 | Van Bers |
| 5,571,617 A | 11/1996 | Cooprider et al. |
| 5,609,933 A | 3/1997 | Stepanek |
| 5,634,309 A | 6/1997 | Polen |
| 5,672,404 A | 9/1997 | Callahan, Jr. et al. |
| 5,683,780 A | 11/1997 | Rodger et al. |
| 5,691,027 A | 11/1997 | Eckhardt et al. |
| 5,693,703 A | 12/1997 | Hart |
| 5,702,796 A | 12/1997 | Thompson |
| 5,706,623 A | 1/1998 | Brown |
| 5,753,336 A | 5/1998 | Stull |
| 5,761,765 A | 6/1998 | Fuzzell |
| 5,763,036 A | 6/1998 | Terry et al. |
| 5,763,040 A | 6/1998 | Murphy et al. |
| 5,822,828 A | 10/1998 | Berard et al. |
| 5,834,081 A | 11/1998 | Fanti |
| 5,849,387 A | 12/1998 | Drake, Jr. et al. |
| 5,859,103 A | 1/1999 | Congelio et al. |
| 5,863,632 A | 1/1999 | Bisker |
| 5,888,335 A | 3/1999 | Kobe et al. |
| 5,908,695 A | 6/1999 | Kobe et al. |
| 5,931,354 A | 8/1999 | Braud et al. |
| 5,942,300 A | 8/1999 | Lukowski, Sr. |
| 5,958,540 A | 9/1999 | Berard et al. |
| 5,995,884 A | 11/1999 | Allen et al. |
| 5,998,018 A | 12/1999 | Murakami et al. |
| 6,004,670 A | 12/1999 | Kobe et al. |
| 6,013,342 A | 1/2000 | Neto |
| 6,027,802 A | 2/2000 | Lin |
| 6,068,904 A | 5/2000 | Steams |
| 6,083,596 A | 7/2000 | Pacione |
| 6,093,469 A | 7/2000 | Callas |
| 6,099,927 A | 8/2000 | Freedman |
| 6,203,881 B1 | 3/2001 | Higgins |
| 6,216,315 B1 | 4/2001 | Fuzzell |
| 6,253,526 B1 | 7/2001 | Murphy et al. |
| 6,260,326 B1 | 7/2001 | Muller-Hartburg |
| 6,306,477 B1 | 10/2001 | Pacione |
| 6,333,073 B1 | 12/2001 | Nelson et al. |
| 6,355,344 B1 | 3/2002 | Mamish et al. |
| 6,409,860 B1 | 6/2002 | Fickeisen et al. |
| 6,426,129 B1 | 7/2002 | Kalwara et al. |
| 6,451,398 B1 * | 9/2002 | Sylvester ............... B29C 44/06 160/40 |
| 6,457,961 B1 | 10/2002 | Drake, Jr. |
| 6,460,303 B1 | 10/2002 | Pacione |
| 6,475,594 B2 | 11/2002 | Johnston et al. |
| 6,503,620 B1 | 1/2003 | Xie et al. |
| 6,509,074 B1 | 1/2003 | Wyman |
| 6,514,585 B1 | 2/2003 | Pearson et al. |
| 6,586,066 B1 | 7/2003 | Buckwater et al. |
| 6,599,599 B1 | 7/2003 | Buckwater et al. |
| 6,599,600 B1 | 7/2003 | Wyman |
| 6,673,177 B2 | 1/2004 | Buckwalter et al. |
| 6,694,682 B2 | 2/2004 | Fanti |
| 6,694,689 B1 | 2/2004 | Scott et al. |
| 6,701,685 B2 | 3/2004 | Rippey |
| 6,756,100 B2 | 6/2004 | Pearson et al. |
| 6,756,102 B1 * | 6/2004 | Galo ..................... C09J 7/02 428/194 |
| 6,763,643 B1 | 7/2004 | Mårtensson |
| 6,790,042 B2 | 9/2004 | Worth |
| 6,797,353 B1 | 9/2004 | Pacione |
| 6,803,090 B2 | 10/2004 | Castiglione et al. |
| 6,841,216 B2 | 1/2005 | Daniel et al. |
| 6,849,317 B1 | 2/2005 | Oakey et al. |
| 6,850,024 B2 | 2/2005 | Peless et al. |
| 6,854,241 B1 | 2/2005 | Pelosi, Jr. |
| 6,861,118 B2 | 3/2005 | Kobayshi et al. |
| 6,866,928 B2 | 3/2005 | Narum et al. |
| 6,872,445 B2 | 3/2005 | Vinod |
| 6,888,459 B2 | 5/2005 | Stilp |
| 6,908,656 B2 | 6/2005 | Daniel |
| 6,966,963 B2 | 11/2005 | O'Connor |
| 6,977,579 B2 | 12/2005 | Gilfix et al. |
| 6,984,952 B2 | 1/2006 | Peless et al. |
| 7,039,522 B2 | 5/2006 | Landau |
| 7,083,841 B2 | 8/2006 | Oakey et al. |
| 7,096,642 B2 | 8/2006 | Higgins et al. |
| 7,148,803 B2 | 12/2006 | Bandy et al. |
| 7,182,989 B2 | 2/2007 | Higgins et al. |
| 7,217,463 B2 | 5/2007 | Henderson |
| 7,225,980 B2 | 6/2007 | Ku et al. |
| 7,242,303 B2 | 7/2007 | Patel et al. |
| 7,245,215 B2 | 7/2007 | Gollu et al. |
| 7,297,385 B2 | 11/2007 | Daniel et al. |
| 7,339,523 B2 | 3/2008 | Bye |
| 7,350,443 B2 | 4/2008 | Oakey et al. |
| 7,464,510 B2 | 12/2008 | Scott et al. |
| 7,601,413 B2 | 10/2009 | Daniel et al. |
| 7,672,780 B2 | 3/2010 | Kim |
| 7,721,502 B2 | 5/2010 | Scott et al. |
| 7,743,568 B2 | 6/2010 | Mars |
| 7,757,457 B2 | 7/2010 | Zah et al. |
| 7,842,346 B1 | 11/2010 | Weiner |
| 8,220,221 B2 | 7/2012 | Gray et al. |
| 8,381,473 B2 | 2/2013 | Scott et al. |
| 8,434,282 B2 | 5/2013 | Scott et al. |
| 8,468,771 B2 | 6/2013 | Gray et al. |
| 8,468,772 B2 | 6/2013 | Oakey et al. |
| 2001/0016244 A1 | 8/2001 | Preston et al. |
| 2002/0025403 A1 | 2/2002 | Lenti |
| 2002/0034606 A1 | 3/2002 | Miller et al. |
| 2002/0071931 A1 | 6/2002 | Drake, Jr. |
| 2002/0119280 A1 | 8/2002 | Higgins |
| 2002/0119281 A1 | 8/2002 | Higgins et al. |
| 2002/0124515 A1 | 9/2002 | Pacione |
| 2002/0132085 A1 | 9/2002 | Higgins et al. |
| 2002/0140393 A1 | 10/2002 | Peless |
| 2002/0142126 A1 | 10/2002 | Higgins et al. |
| 2002/0160144 A1 | 10/2002 | Higgins et al. |
| 2003/0003263 A1 | 1/2003 | Smith |
| 2003/0071051 A1 | 4/2003 | Martinsen |
| 2003/0072911 A1 | 4/2003 | Higgins et al. |

(56) References Cited

U.S. PATENT DOCUMENTS

| | | | |
|---|---|---|---|
| 2003/0161990 A1 | 8/2003 | Higgins et al. | |
| 2003/0170420 A1 | 9/2003 | Higgins et al. | |
| 2003/0180091 A1 | 9/2003 | Stridsman | |
| 2004/0062899 A1* | 4/2004 | Kobayashi | A47G 27/025 428/48 |
| 2004/0093811 A1 | 5/2004 | Oakey et al. | |
| 2004/0095244 A1 | 5/2004 | Conwell et al. | |
| 2004/0129365 A1 | 7/2004 | Buckwalter et al. | |
| 2004/0175535 A1 | 9/2004 | Bell | |
| 2004/0185682 A1 | 9/2004 | Foulke et al. | |
| 2004/0258870 A1 | 12/2004 | Oakey et al. | |
| 2005/0007057 A1 | 1/2005 | Peless | |
| 2005/0059308 A1 | 3/2005 | Parsons | |
| 2005/0089678 A1 | 4/2005 | Mead | |
| 2005/0099291 A1 | 5/2005 | Landau | |
| 2005/0099306 A1 | 5/2005 | Gilfix et al. | |
| 2005/0249912 A1* | 11/2005 | Randall | B29C 44/022 428/95 |
| 2005/0261571 A1 | 11/2005 | Willis et al. | |
| 2006/0010804 A1 | 1/2006 | Gray et al. | |
| 2006/0048797 A1 | 3/2006 | Jung et al. | |
| 2006/0156663 A1 | 7/2006 | Mao | |
| 2006/0162269 A1 | 7/2006 | Pacione et al. | |
| 2006/0164236 A1 | 7/2006 | Siegl et al. | |
| 2006/0261951 A1 | 11/2006 | Koerner et al. | |
| 2006/0293794 A1 | 12/2006 | Harwig et al. | |
| 2007/0039679 A1 | 2/2007 | Urban et al. | |
| 2007/0061075 A1 | 3/2007 | Kim | |
| 2007/0069021 A1 | 3/2007 | Elrod et al. | |
| 2007/0126634 A1 | 6/2007 | Bye | |
| 2008/0213529 A1 | 9/2008 | Gray et al. | |
| 2008/0271840 A1 | 11/2008 | Randall et al. | |
| 2009/0045918 A1 | 2/2009 | Droesler et al. | |
| 2009/0094919 A1 | 4/2009 | Scott et al. | |
| 2010/0024329 A1 | 2/2010 | Gray et al. | |
| 2010/0051169 A1 | 3/2010 | Sheppard et al. | |
| 2010/0176189 A1 | 7/2010 | Gray et al. | |
| 2010/0251641 A1 | 10/2010 | Gallagher et al. | |
| 2011/0008567 A1 | 1/2011 | Weeks et al. | |
| 2011/0061328 A1 | 3/2011 | Sandy et al. | |
| 2011/0082241 A1 | 4/2011 | Kaneda et al. | |
| 2011/0107720 A1 | 5/2011 | Oakey et al. | |
| 2011/0285296 A1* | 11/2011 | Vanherpen | 315/159 |
| 2013/0014460 A1 | 1/2013 | Scott et al. | |

FOREIGN PATENT DOCUMENTS

| | | |
|---|---|---|
| AU | 2008230828 | 10/2008 |
| AU | 2011200866 | 3/2011 |
| AU | 2005295322 | 5/2011 |
| BR | PI 313495-4 | 7/2005 |
| BR | PI 0518165-8 | 11/2008 |
| BR | PI 0809431-4 | 9/2014 |
| CA | 567944 A | 12/1958 |
| CA | 1287966 | 8/1991 |
| CA | 2421763 | 3/2002 |
| CA | 2495101 | 2/2004 |
| CA | 2583532 | 4/2006 |
| CA | 2679004 | 10/2008 |
| CN | 2116040 U | 9/1992 |
| CN | 1132533 | 10/1996 |
| CN | 1787768 | 6/2006 |
| CN | 101084350 | 12/2007 |
| CN | 101218288 | 7/2008 |
| CN | ZL200580042610.7 | 9/2009 |
| CN | 101614066 | 12/2009 |
| CN | 201375371 | 1/2010 |
| CN | 201375371 Y | 1/2010 |
| CN | 101646737 | 2/2010 |
| CN | 101918503 | 12/2010 |
| CN | 102575418 | 7/2012 |
| CN | ZL200910164633.5 B | 1/2013 |
| CN | ZL200880010206.5 | 7/2013 |
| DE | 1913002 A1 | 3/1970 |
| DE | 2027415 A1 | 12/1971 |
| DE | 2304392 | 8/1973 |
| DE | 2649644 | 5/1978 |
| DE | 10001551 | 7/2001 |
| DE | 20111113 U1 | 10/2001 |
| DE | 102004007595 | 9/2005 |
| EP | 0017986 | 10/1980 |
| EP | 0 062 738 A2 | 4/1981 |
| EP | 0 043 714 A1 | 1/1982 |
| EP | 0044533 | 1/1982 |
| EP | 0237657 A1 | 9/1987 |
| EP | 239041 | 9/1987 |
| EP | 0 333 396 A2 | 9/1989 |
| EP | 0374860 A2 | 6/1990 |
| EP | 0942111 A | 9/1999 |
| EP | 1313079 | 5/2003 |
| EP | 2129735 | 12/2009 |
| EP | 2258908 | 12/2010 |
| EP | 2258909 | 12/2010 |
| EP | 2374855 | 10/2011 |
| EP | 2374856 | 10/2011 |
| EP | 2374857 | 10/2011 |
| EP | 2417311 | 2/2012 |
| EP | 2 554 616 A2 | 2/2013 |
| FR | 1239859 A | 8/1960 |
| FR | 2278876 | 2/1976 |
| FR | 2582210 A1 | 11/1986 |
| FR | 2903707 | 1/2008 |
| GB | 345066 | 3/1931 |
| GB | 01350767 | 4/1974 |
| GB | 1 376 262 | 12/1974 |
| GB | 1 416 684 | 12/1975 |
| GB | 1 546 901 | 5/1979 |
| GB | 2113993 A | 8/1983 |
| GB | 2182961 | 5/1987 |
| GB | 2 193 238 A | 2/1988 |
| GB | 2 198 369 A | 6/1988 |
| GB | 2 214 464 A | 9/1989 |
| GB | 2299019 A | 9/1996 |
| GB | 2342040 | 4/2000 |
| GB | 2389075 | 12/2003 |
| HK | 1114890 | 4/2010 |
| JP | S36-5071 | 5/1961 |
| JP | S49-30420 | 8/1974 |
| JP | S53-019639 | 2/1978 |
| JP | 55086714 A | 6/1980 |
| JP | 62010181 | 1/1987 |
| JP | H02-088015 | 3/1990 |
| JP | 2-038152 | 8/1990 |
| JP | H02-283781 | 11/1990 |
| JP | 4002306 A | 1/1992 |
| JP | 4367627 A | 12/1992 |
| JP | H5-163825 | 6/1993 |
| JP | 7127236 A | 5/1995 |
| JP | 7-76333 B | 8/1995 |
| JP | 7-259305 A | 10/1995 |
| JP | 8134419 A | 5/1996 |
| JP | 9209545 A | 8/1997 |
| JP | 9-279106 | 10/1997 |
| JP | 09209546 A | 12/1997 |
| JP | 11270115 | 10/1999 |
| JP | 11335629 A | 12/1999 |
| JP | 2000328759 | 11/2000 |
| JP | 2001-115631 A | 4/2001 |
| JP | 2004003191 | 1/2004 |
| JP | 2005-523092 | 8/2005 |
| JP | 2005-538760 | 12/2005 |
| JP | 2007-536440 | 12/2007 |
| JP | 2008-517190 | 5/2008 |
| JP | 2009-292965 | 12/2009 |
| JP | 2010-523841 | 7/2010 |
| JP | 2011-94478 | 5/2011 |
| JP | 4945452 | 3/2012 |
| JP | 5616803 | 10/2014 |
| KR | 0000056991 A | 9/2000 |
| KR | 10-2007-0068368 | 6/2007 |
| KR | 10-2010-0014594 | 2/2010 |
| MX | PA 03002223 | 6/2003 |
| MX | 285845 | 4/2011 |

(56) References Cited

FOREIGN PATENT DOCUMENTS

| | | |
|---|---|---|
| NL | 1028881 | 4/2005 |
| WO | WO 86/01247 A1 | 2/1986 |
| WO | WO 95/06771 | 3/1995 |
| WO | WO 98/03104 A1 | 1/1998 |
| WO | WO-1998010688 | 3/1998 |
| WO | WO-1998020330 | 5/1998 |
| WO | WO-1998035276 | 8/1998 |
| WO | WO 00/31202 | 6/2000 |
| WO | WO-2000047837 | 8/2000 |
| WO | WO-2000075417 | 12/2000 |
| WO | WO 02/25004 A2 | 3/2002 |
| WO | WO-2002025004 | 3/2002 |
| WO | WO 02/057384 A2 | 7/2002 |
| WO | WO-2003060256 | 7/2003 |
| WO | WO 2004/016848 A2 | 2/2004 |
| WO | WO-2004016848 | 2/2004 |
| WO | WO 2004/085737 A2 | 10/2004 |
| WO | WO-2005071597 | 8/2005 |
| WO | WO-2005092632 | 10/2005 |
| WO | WO 2005/116325 A2 | 12/2005 |
| WO | WO-2005112775 | 12/2005 |
| WO | WO-2005118273 | 12/2005 |
| WO | WO 2006/044928 A2 | 4/2006 |
| WO | WO-2006044928 | 4/2006 |
| WO | WO-2006045819 | 5/2006 |
| WO | WO-2006065430 | 6/2006 |
| WO | WO-2006065839 | 6/2006 |
| WO | WO-2006066299 | 6/2006 |
| WO | WO-2006096431 | 9/2006 |
| WO | WO-2006116528 | 11/2006 |
| WO | WO 2006/135809 | 12/2006 |
| WO | WO-2006/135809 A2 | 12/2006 |
| WO | WO-2006128783 | 12/2006 |
| WO | WO-2007002708 | 1/2007 |
| WO | WO-2007018523 | 2/2007 |
| WO | WO-2007033980 | 3/2007 |
| WO | WO 07/047844 A2 | 4/2007 |
| WO | WO-2007072389 | 6/2007 |
| WO | WO-2007081823 | 7/2007 |
| WO | WO-2007098925 | 9/2007 |
| WO | WO-2008119003 | 10/2008 |
| WO | WO 2009/059366 | 5/2009 |
| WO | WO-2010118084 | 10/2010 |
| WO | WO-2010144897 | 12/2010 |
| WO | WO 2011/005828 | 1/2011 |
| WO | WO 2011/032075 A2 | 3/2011 |

OTHER PUBLICATIONS

International Search Report—PCT/US2005/037507—Apr. 17, 2007, Interface, Inc.
3M 9191,9195 Doppelseitige Klebebänder mit Träger, 2 pages, Jul. 1998.
El-Zabadani, Hicham et al., "A Mobile Sensor Platform Approach to Sensing and Mapping Pervasive Spaces and Their Contents", Mobile & Pervasive Computing Laboratory, CISE Dept., University of Florida, date unknown.
WOLFF TFV Carpet Tile Connector, WOLFF GmbH, WOLFF TFV Carpet Tile Connector, WOLFF GmbH, 1987, 2 pages.
Breaking New Ground in Flooring, TacFast Systems International website, www.tacfastsystems.com, downloaded on Mar. 3, 2004, 1 page.
Carpet Bargains, http://web.archive.org/web/19990827025011/carpetbargains.com/index.htm, Retrieved Apr. 10, 2006, 2 pages.
Merchandising. Merriam-Webster Online Dictionary, http://webster.com/dictionary/merchandising, retrieved Apr. 10, 2006, 2 pages.
International Search Report—PCT/US2010/048600, dated Sep. 13, 2010, Tandus Flooring Inc.
Written Opinion—PCT/US2010/048600, dated Sep. 13, 2010, Tandus Flooring Inc.
H. Muijser et al., "Behavioral Effects of Exposure to Organic Solvents in Carpet Layers", Neurotoxicology and Teratology, vol. 18, No. 4, pp. 455-462, 1996.
Singapore Search Report in SG Application No. 2013080429 dated Jul. 11, 2014.
Singapore Written Opinion in SG Application No. 2013080429 dated Jul. 11, 2014.
D882-02, "Standard Test Method for Tensile Properties of Thin Plastic Sheeting," ASTM International.
Chinese Office Action dated Jan. 12, 2015 in Chinese Patent Application No. 201280028527.4.
Extended European Search Report in European Application No. 15152617.5-1308 dated May 20, 2015.
D2797-01(2009), "Standard Test Method for Pressure-Sensitive Tack of Adhesives Using an Inverted. Probe Machine" (2009) (3 pp.).
JP Application No. 2014-5094441, Office Action dated Sep. 29, 2016 (6 pp.) (with translation).

* cited by examiner

MODULAR CARPET SYSTEMS

CROSS-REFERENCE TO RELATED APPLICATIONS

This application claims the benefit of U.S. Provisional Application No. 61/482,336, filed May 4, 2011, and U.S. Provisional Application No. 61/505,160, filed Jul. 7, 2011, both of which are incorporated by reference herein in their entirety.

TECHNICAL FIELD

This disclosure generally relates to modular carpet systems (i.e., carpet tile systems). More particularly, this disclosure relates to modular carpet systems that are suitable for use in a wide variety of installation environments.

BACKGROUND

Modular carpet systems (i.e., carpet tile systems) are often sought to be installed in a wide range of environments. Unfortunately, such environments often expose such systems to adverse elements, such as standing water, alkaline conditions, high humidity, and other potentially challenging conditions. Conventional modular carpet systems are generally not able to withstand such conditions, and therefore, tend to loosen, buckle, shrink, and/or warp over time. Thus, there is a need for a modular carpet system that can be used in adverse installation conditions without degradation or failure.

SUMMARY

This disclosure is directed generally to a modular carpet (e.g., carpet tile) system for use in a wide variety of installation environments. In particular, the modular carpet system may be suitable for use even in adverse installation conditions.

The modular carpet system generally includes a carpet tile, and an adhesive for securing the carpet tiles in a desired position (e.g., in a side-by-side relationship with other carpet tiles) on an installation surface. The carpet tile may generally resist deformation or warping, even in adverse installation conditions. Such conditions may include installation on a floor having a moisture vapor emission rate (MVER) of at least about 4 lb/24 hr/1000 sq. ft., an in situ relative humidity (RH) in the floor of at least about 80%, a surface moisture pH of at least about 8, or any combination thereof. Likewise, the adhesive may resist failure or substantial loss of adhesion, even in adverse installation conditions.

The carpet tile may generally include a face comprising woven or tufted face yarns, and a backing (commonly referred to as a "secondary backing") for being positioned in a facing relationship with the installation surface. In one example, the backing may comprise a polymer or polymeric material that is at least 50% amorphous, for example, polyvinyl butyral (PVB). The adhesive may comprise any suitable adhesive, for example, a silicone-based adhesive or a polyurethane-based adhesive. However, numerous other materials may be suitable. The adhesive component may be provided as an adhesive coating, a fastener (e.g., an adhesive tape or unsupported adhesive), or in any other suitable manner.

Although these systems are suitable for use in adverse environments, they can also be used in standard environments which do not have adverse conditions. Further, the systems may be used on any suitable installation surface. For example, the installation surface may comprise a floor or flooring surface (e.g., concrete, wood, etc.) that may be primed, painted, or coated with other materials, or may comprise an underlayment (e.g., for cushioning or waterproofing) or other material disposed between the actual floor or flooring surface and the carpet tile. For convenience, the terms "floor", "flooring", "surface", "flooring surface", and "installation surface" are used herein interchangeably.

Other features, aspects, and embodiments will be apparent from the following description.

DESCRIPTION

This disclosure is directed generally to a modular carpet (e.g., carpet tile) system for use in a wide variety of installation environments, including adverse installation environments. The modular carpet system of this disclosure generally includes a modular carpet (e.g., carpet tile) that can remain dimensionally stable (i.e., such that it resists both deformation in the x, y, and z directions and deviation from a planar state), even in adverse installation conditions, and an adhesive that can resist substantial loss in adhesion, even in adverse installation conditions.

In sharp contrast, a carpet tile that is not dimensionally stable may begin to buckle, warp, or curl, thereby pulling away from the adhesive and/or the installation surface, while an unstable adhesive may begin to lose adhesion, thereby releasing the carpet tile from its secured position. Thus, if the stability of either the tile or the adhesive is significantly impaired by the adverse condition, the tiles may undesirably shift or move from their desired edge-to-edge (e.g., side-by-side) configuration.

The modular carpet system of this disclosure may be able to withstand (i.e., remain stable in) a variety of adverse conditions. For example, the modular carpet system may generally be stable when installed on a floor having a moisture vapor emission rate (MVER) of at least about 4 lb/24 hr/1000 sq. ft., at least about 5 lb/24 hr/1000 sq. ft., at least about 6 lb/24 hr/1000 sq. ft., at least about 7 lb/24 hr/1000 sq. ft., at least about 8 lb/24 hr/1000 sq. ft., at least about 9 lb/24 hr/1000 sq. ft., at least about 10 lb/24 hr/1000 sq. ft., at least about 11 lb/24 hr/1000 sq. ft., at least about 12 lb/24 hr/1000 sq. ft., at least about 13 lb/24 hr/1000 sq. ft., at least about 14 lb/24 hr/1000 sq. ft., at least about 15 lb/24 hr/1000 sq. ft., or at least about 16 lb/24 hr/1000 sq. ft., as measured using ASTM F1869-04 or any other suitable test method.

As another example, the modular carpet system may be stable when installed on a floor having an in situ relative humidity of at least about 80%, at least about 85%, at least about 90%, or at least about 95%, as measured for example, using ASTM F2170-02 or any other suitable test method. In one specific example, the modular carpet system may be stable when installed on a floor having an in situ relative humidity of 100%, as measured using ASTM F2170-02 or any other suitable test method.

As still another example, the modular carpet system may be stable when installed on a floor having a surface pH (e.g., surface moisture pH) of at least about 8, at least about 9, at least about 10, at least about 11, at least about 12, or at least about 13, as measured using ASTM F710-05 or any other suitable test method.

As yet another example, the modular carpet system may be stable when installed on a floor having any combination of the above features.

The present inventors have discovered that the use of a tile that remains dimensionally stable, even when exposed to adverse conditions, in combination with an adhesive that can withstand adverse conditions without a substantial loss in adhesion provides substantial benefits that previously had not been able to be achieved by known tile systems. Specifically, by using these components in combination, the system may be installed in many environments that would previously have been considered entirely unsuitable. Thus, the present system fills a substantial void in the marketplace.

Turning now to the individual components of the system, a carpet tile that is dimensionally stable generally exhibits little or no change in its length, width, or thickness, or deviation from a planar state, in response to various environmental factors, so the entire tile is able to remain in a substantially facing relationship (e.g., an opposing, contacting face-to-face relationship) with the installation surface over time. The dimensional stability of a carpet tile therefore includes both components of linear stability (i.e., change in length or width (MD or CD), for example, growth or shrinkage) and planar stability (i.e., a deviation from a planar/flat/level/even) state, for example, doming or curling, which also often indicates a change in z-directional thickness).

Linear stability may generally be characterized as exhibiting a change in length or width of the carpet tile of less than about 0.15%, for example, less than about 0.14%, less than about 0.13%, less than about 0.12%, less than about 0.11%, less than about 0.10%, less than about 0.09%, less than about 0.08%, less than about 0.07%, less than about 0.06%, less than about 0.05%, less than about 0.04%, less than about 0.03%, less than about 0.02%, or less than about 0.01%, after exposure to adverse conditions, as measured using ISO 2551 or any other suitable test method. This corresponds to a change in less than about 0.027 in. for an 18 in.×18 in. tile (i.e., no more than +/−0.027 in.), less than about 0.036 in. for an 24 in.×24 in. tile (i.e., no more than +/−0.036 in.), or less than about 0.054 in. for an 36 in.×36 in. tile (i.e., no more than +/−0.054 inch), for example, as measured using ISO 2551 or any other suitable test method.

Planar stability may generally be characterized exhibiting a planar deviation of less than about 0.078 in., less than about 0.075 in., less than about 0.070 in., less than about 0.065 in., less than about 0.060 in., less than about 0.055 in., less than about 0.050 in., less than about 0.045 in., less than about 0.040 in., less than about 0.035 in., less than about 0.030 in., less than about 0.025 in., less than about 0.020 in., less than about 0.015 in., or less than about 0.010 in., as measured for example, before and/or after heating according to ISO 2551 or other suitable test method.

The present inventors have recognized that the characteristics of the backing (i.e., secondary backing) of the carpet tile may substantially determine whether a particular carpet tile is dimensionally stable, even in adverse conditions. More particularly, the present inventors have discovered that a backing that is somewhat flexible tends to lie more flat on the installation surface, which assists with resisting dimensional changes when exposed to adverse conditions.

In one aspect, the backing may comprise a polymer having an amorphous content of at least about 50%. While not wishing to be bound by theory, it is believed that having at least 50% amorphous polymer content in the backing allows the polymer in the backing to "flow" and adapt more readily to the conditions of the installation environment. In each of various examples, the polymer of the backing may have an amorphous content of at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %. In another example, the polymer of the backing may have an amorphous content of 100%.

In one example, the polymer of the backing may comprise polyvinyl butyral (PVB). The present inventors have discovered that a backing comprising PVB may be particularly suitable for use for providing stability in a modular carpet system, even in adverse conditions. While not wishing to be bound by theory, it is believed that the completely amorphous (i.e., 100% amorphous) nature of PVB imparts an inherent flexibility to the backing. Additionally, it is believed that the molecular weight of the PVB polymer is sufficiently high to resist attack by moisture, plasticizers, and caustic environments. Still other possibilities are contemplated. One example of a commercially available backing including a polymer that is at least 50% amorphous is ETHOS® tile backing, commercially available from Tandus Flooring, Inc. The Ethos® carpet tile, which comprises PVB, has been found to be dimensionally stable in adverse conditions, as will be discussed further below.

In other examples, the polymer of the backing may comprise modified polycarbonate, ultra high molecular weight polyethylene (UHMWPE), atactic polypropylene (a-PP), silicone elastomers, thermoplastic polyolefins, thermoplastic elastomers, bitumen, or any combination thereof. All of such polymers may be at least 50% amorphous.

If desired, the backing may include a filler in an amount of from about 40 to about 75 wt % of the backing. While not wishing to be bound by theory, it is believed that the presence of filler at this level imparts a degree of dimensional stability to the backing that allows the tile to remain substantially flat, even in adverse conditions. Further, it is believed that the filler also assists with stabilizing the amorphous polymer, which can sometimes exhibit poor cold flow performance (i.e., the distortion, deformation, or dimensional change that takes place in materials under continuous load at ambient temperatures). Accordingly, the backing may be better able to maintain its shape and dimensional stability, even in adverse conditions.

Thus, in each of various independent examples, the backing may comprise, for example, from about 42 to about 65 wt %, from about 44 to about 60 wt %, from about 45 to about 55 wt %, for example, about 48%, or about 48.5 wt % filler, with the remainder comprising polymer or polymeric materials, such as the at least 50% amorphous polymers described above. Any filler may be used, for example, calcium carbonate, coal fly ash, barium sulfate, talc, any other suitable material, or any combination thereof.

Further, if desired, the backing may include a plasticizer (i.e., may be externally plasticized). While countless plasticizers may be suitable, in one example, the plasticizer may comprise a C8 (eight carbons) or greater alcohol based ester plasticizer.

In other examples, the backing may comprise a polymer that may be less than 50% amorphous. For example, the polymer may be less than 40% amorphous, less than 30% amorphous, less than 20% amorphous, or less than 10% amorphous. Stated alternately, the polymer may be at least about 10% amorphous, at least about 20% amorphous, at least about 30% amorphous, or at least about 40% amorphous. Examples of such polymers may include, but are not limited to, polyethylene terephthalate, thermoplastic polyurethane, poly(trimethylene terephthalate), polylactic acid, polyvinylidene chloride, ethylene vinyl acetate, thermoplastic polyolefin or other polyolefin, thermoplastic elastomer, acrylonitrile-styrene-butadiene, nylon, styrene-butadiene, styrene-butadiene-styrene, styrene-butadiene-rubber, acrylic, vinyl acrylic, styrene acrylic, vinyl acetate ethylene copolymer, cork, or rubber. Still countless other possibilities are contemplated. Fillers may also be used with such materials, as described above.

Numerous adhesives may likewise be suitable for use with the modular carpet system, provided that the adhesive is stable, even when exposed to adverse installation conditions, as set forth above. The adhesive may also be suitable for use with externally plasticized backings.

In one exemplary embodiment, the adhesive may be silicone-based (e.g., may comprise a silicone-based polymer, silicone elastomer, modified silicone elastomer, silicone-based elastomer, etc.). Some examples of suitable silicone-based adhesives have been evaluated in connection with various commercially available adhesive tapes including, but not limited to SR336R release coated polyester silicone tape (commercially available from Specialty Tapes Manufacturing, Franksville, Wis.), Tesa 50600 polyester tape with silicone-based adhesive (commercially available from Tesa SE), ARclad 6370 polyester tape with silicone-based adhesive (commercially available from Adhesives Research, Glen Rock, Pa.), and SC-4075 polyester tape with silicone-based adhesive (commercially available from Custom Adhesive Products, Racine, Wis.), each of which is described in greater detail below. Countless other silicone-based adhesives may also be suitable.

In another exemplary embodiment, the adhesive may be urethane-based (e.g., may comprise polyurethane, castor oil based urethane, urethane hot melt, polyurethane reactive, etc.). Examples of urethane-based adhesives that may be suitable for use with the modular carpet system are Hauthane L2183 and Hauthane L3378, both commercially available from Hauthaway Corporation, Lynn, Mass.). However, countless others may be suitable.

In still other exemplary embodiments, the adhesive may be acrylic-based, modified acrylic, styrene-based (e.g., styrene-butadiene, styrene-butadiene-styrene, styrene-butadiene-rubber, styrene-acrylic), hot melt based (e.g., rubber based hotmelt, EVA, EVA based hotmelt, urethane based hotmelt), butadiene-based (e.g., styrene-butadiene, styrene-butadiene-styrene, styrene-butadiene-rubber), epoxy-based, rubber based (e.g., natural or synthetic rubber), modified rubber, cyanoacrylate, PVB, biopolymer-based (e.g., vinyl acetate ethylene copolymers or castor oil based urethane). Further, any combination or copolymer of any of the above adhesives (including the silicone-based and urethane adhesives) may be suitable.

Prior to being exposed to adverse conditions (e.g., as set forth above), the adhesive may generally have an adhesive tack that is greater than 2.3 lb-f, for example, at least about 2.5 lb-f, for example, at least about 3 lb-f, at least about 3.5 lb-f, at least about 4 lb-f, at least about 4.5 lb-f, at least about 5 lb-f, at least about 5.5, at least about 6 lb-f, at least about 6.5 lb-f, at least about 7 lb-f, at least about 7.5 lb-f, at least about 8 lb-f, at least about 8.5 lb-f, at least about 9 lb-f, at least about 9.5 lb-f, at least about 10 lb-f, or at least about 10.6 lb-f, as measured using ASTM D2979 or any other suitable test method. (To convert the adhesive tack values throughout this specification into lb-f/sq. in, the value can be divided by the probe area of 0.66 sq. in.).

After about one day, about 7 days, or about 14 of exposure to one or more adverse conditions, as set forth above, the adhesive tack may generally be greater than 1.3 lb-f, for example, at least about 1.5 lb-f, at least about 2 lb-f, at least about 2.5 lb-f, at least about 3 lb-f, at least about 3.5 lb-f, at least about 4 lb-f, at least about 4.5 lb-f, at least about 5 lb-f, at least about 5.5 lb-f, at least about 6 lb-f, at least about 6.5 lb-f, at least about 7 lb-f, at least about 7.5 lb-f, at least about 8 lb-f, at least about 8.5 lb-f, at least about 9 lb-f, at least about 9.5 lb-f, or at least about 10 lb-f, as measured using ASTM D2979 or any other suitable test method. However, other adhesive tack values and ranges thereof are contemplated, depending on the adhesive used and the conditions to which the adhesive is exposed.

For example, after about 1 day, about 7 days, or about 14 days of being immersed in water, the adhesive tack may be greater than 1.3 lb-f, for example, at least about 1.5 lb-f, at least about 2 lb-f, at least about 2.4 lb-f, at least about 2.5 lb-f, at least about 3 lb-f, at least about 3.5 lb-f, at least about 3.6 lb-f, at least about 4 lb-f, at least about 4.1 lb-f, at least about 4.5 lb-f, at least about 5 lb-f, at least about 5.3 lb-f, at least about 5.5 lb-f, at least about 6 lb-f, at least about 6.5 lb-f, at least about 7 lb-f, at least about 7.5 lb-f, or at least about 8 lb-f, as measured using ASTM D2979 or any other suitable test method.

After being immersed in water for about 1 day, about 7 days, or about 14 days, the decrease in adhesive tack may be less than about 42.8% or less than about 43%, for example, less than about 40%, less than about 35%, less than about 30%, less than about 28%, less than about 27.6%, less than about 25%, less than about 20%, less than about 15%, less than about 11%, less than about 11.3%, less than about 10%, less than about 7%, less than about 6.6%, or less than about 5%. In some examples, there may be no loss of adhesion or there may be an increase in adhesion after immersion in water for the specified period of time.

After about 1 day, about 7 days, or about 14 days of being immersed in a pH 12 solution, the adhesive tack may be greater than 1.5 lb-f, for example, at least about 1.6 lb-f, at least about 2 lb-f, at least about 2.5 lb-f, at least about 2.7 lb-f, at least about 3 lb-f, at least about 3.2 lb-f, at least about 3.5 lb-f, at least about 3.6 lb-f, at least about 4 lb-f, at least about 4.1 lb-f, at least about 4.5 lb-f, at least about 5 lb-f, at least about 5.5 lb-f, at least about 6 lb-f, at least about 6.5 lb-f, at least about 7 lb-f, at least about 7.5 lb-f, or at least about 8 lb-f, as measured using ASTM D2979 or any other suitable test method.

Prior to being exposed to adverse conditions (e.g., as set forth above), the adhesive may generally have a shear (i.e., lap shear) strength of from about 130 to about 200 lb-f, for example, from about 140 to about 170 lb-f, for example, about 150 lb-f, when adhered to various surfaces and measured using ASTM D3654 (as modified herein) or any other suitable test method. (To convert the lap shear adhesion values throughout this specification into lb-f/sq. in, the value can be divided by the contact area of 6 sq. in.). In other embodiments, the shear strength of the adhesive may be at least about 130 lb-f, for example, at least about 140 lb-f, at least about 150 lb-f, at least about 160 lb-f, at least about 163 lb-f, at least about 170 lb-f, at least about 180 lb-f, at least about 190 lb-f, or at least about 200 lb-f, as measured using ASTM D3654 (as modified herein) or any other suitable test method, prior to exposure to adverse conditions.

After about one day of exposure to one or more adverse conditions, as set forth above, the shear strength of the adhesive may be greater than 98 lb-f, for example, at least about 100 lb-f, at least about 110 lb-f, at least about 120 lb-f, at least about 130 lb-f, at least about 140 lb-f, at least about 150 lb-f, at least about 160 lb-f, at least about 170 lb-f, at least about 180 lb-f, at least about 190 lb-f, or at least about 200 lb-f, as measured using ASTM D3654 (as modified herein) or any other suitable test method. After about 7 days of exposure to one or more adverse conditions, as set forth above, the shear strength of the adhesive may be greater than 84 lb-f, for example, at least about 90 lb-f, for example, at least about 100 lb-f, at least about 110 lb-f, at least about 120 lb-f, at least about 130 lb-f, for example, at least about 140 lb-f, at least about 150 lb-f, at least about 160 lb-f, at least about 170 lb-f, or at least about 180 lb-f, as measured using ASTM D3654 (as modified herein) or any other suitable test method. After about 14 days of exposure to one or more adverse conditions, as set forth above, the shear strength of the adhesive may be greater than 106 lb-f, for example, at least about 110 lb-f, at least about 120 lb-f, at least about 130 lb-f, for example, at least about 140 lb-f, at least about 150 lb-f, at least about 160 lb-f, at least about 170 lb-f, or at least about 180 lb-f, as measured using ASTM D3654 (as modified herein) or any other suitable test method. However, other shear strength values and ranges thereof are contemplated, depending on the adhesive used and the conditions to which the adhesive is exposed.

For example, after about one day of being immersed in water, the shear strength may be greater than 109 lb-f, for example, at least about 110 lb-f, at least about 120 lb-f, at least about 130 lb-f, at least about 140 lb-f, at least about 150 lb-f, at least about 158 lb-f, at least about 160 lb-f, at least about 170 lb-f, at least about 180 lb-f, at least about 190 lb-f, or at least about 200 lb-f, as measured using ASTM D3654 (as modified herein) or any other suitable test method. After about one day of being immersed in water, the shear strength may decrease less than 27.4%, for example, less than about 27%, less than about 25%, for example, less than about 20%, less than about 15%, less than about 10%, less than about 6.9%, less than about 5.1%, less than about 5%, or less than about 4%. In some examples, there may be no loss of adhesion or there may be an increase in adhesion after being immersed in water for about one day.

After about 7 days of being immersed in water, the shear strength may be greater than 84 lb-f, for example, at least about 90 lb-f, at least about 100 lb-f, at least about 110 lb-f, at least about 120 lb-f, at least about 122 lb-f, at least about 130 lb-f, at least about 140 lb-f, at least about 150 lb-f, at least about 158 lb-f, at least about 160 lb-f, at least about 170 lb-f, at least about 180 lb-f, at least about 184 lb-f, at least about 190 lb-f, or at least about 200 lb-f, as measured using ASTM D3654 (as modified herein) or any other suitable test method. After about 7 days of being immersed in water, the shear strength may decrease less than 43.9%, for example, less than about 43%, less than about 40%, less than about 35%, less than about 30%, less than about 25%, less than about 20%, less than about 18.9%, less than about 15%, less than about 10%, or less than about 5%. In some examples, there may be no loss of adhesion or there may be an increase in adhesion after being immersed in water for about 7 days.

After about 14 days of being immersed in water, the shear strength may be greater than 112 lb-f, for example, at least about 120 lb-f, at least about 130 lb-f, at least about 140 lb-f, at least about 143 lb-f, at least about 150 lb-f, at least about 160 lb-f, at least about 170 lb-f, at least about 180 lb-f, at least about 187 lb-f, at least about 190 lb-f, or at least about 200 lb-f, as measured using ASTM D3654 (as modified herein) or any other suitable test method. After about 14 days of being immersed in water, the shear strength may decrease less than 25.6%, for example, less than about 25%, less than about 20%, less than about 15%, less than about 10%, or less than about 5%. In some examples, there may be no loss of adhesion or there may be an increase in adhesion after being immersed in water for about 14 days.

As another example, after about one day of being immersed in a high pH solution (e.g., about 12), the shear strength of the adhesive may be greater than 98 lb-f, for example, at least about 100 lb-f, at least about 110 lb-f, at least about 120 lb-f, at least about 130 lb-f, at least about 140 lb-f, at least about 150 lb-f, at least about 158 lb-f, at least about 160 lb-f, at least about 170 lb-f, at least about 177 lb-f, at least about 180 lb-f, at least about 190 lb-f, or at least about 200 lb-f, as measured using ASTM D3654 (as modified herein) or any other suitable test method. After about one day of being immersed in a high pH solution (e.g., about 12), the decrease in shear strength may be less than 35.1%, for example, less than about 35%, less than about 30%, less than about 25%, less than about 20%, less than about 18.9%, less than about 15%, less than about 10%, less than about 8.7%, less than about 5.4%, or less than about 5%. In some examples, there may be no loss of adhesion or there may be an increase in adhesion after being immersed in a high pH solution for about one day.

After about 7 days of being immersed in a high pH solution (e.g., about 12), the shear strength of the adhesive may be greater than 89 lb-f, for example, at least about 90 lb-f, at least about 100 lb-f, at least about 110 lb-f, at least about 120 lb-f, at least about 124 lb-f, at least about 130 lb-f, at least about 140 lb-f, at least about 150 lb-f, at least about 160 lb-f, at least about 170 lb-f, at least about 180 lb-f, at least about 190 lb-f, at least about 194 lb-f, or at least about 200 lb-f, as measured using ASTM D3654 (as modified herein) or any other suitable test method. After about 7 days of being immersed in a high pH solution (e.g., about 12), the decrease in shear strength may be less than 41.1%, for example, less than about 41%, less than about 40%, less than about 35%, less than about 30%, less than about 25%, less than about 20%, less than about 18.7%, less than about 17.8%, less than about 15%, less than about 10%, or less than about 5%. In some examples, there may be no loss of adhesion or there may be an increase in adhesion after being immersed in a high pH solution for about 7 days.

After about 14 days of being immersed in a high pH solution (e.g., about 12), the shear strength of the adhesive may be greater than 106 lb-f, for example, at least about 110 lb-f, at least about 117 lb-f, at least about 120 lb-f, at least about 130 lb-f, at least about 140 lb-f, at least about 150 lb-f, at least about 160 lb-f, at least about 170 lb-f, at least about 180 lb-f, at least about 188 lb-f, at least about 190 lb-f, at least about 200 lb-f, as measured using ASTM D3654 (as modified herein) or any other suitable test method. After about 14 days of being immersed in a high pH solution (e.g., about 12), the decrease in shear strength may be less than 29.5%, for example, less than about 29%, less than about 25%, less than about 22.1%, less than about 20%, less than about 15.3%, less than about 15%, less than about 10%, or less than about 5%. In some examples, there may be no loss of adhesion or there may be an increase in adhesion after being immersed in a high pH solution for about 14 days.

As another example, after about one day of exposure to water vapor (e.g., 100% relative humidity), the shear strength of the adhesive may be greater than 155 lb-f, for example, at least about at least about 160 lb-f, at least about 170 lb-f, at least about 177 lb-f, at least about 180 lb-f, at least about 190 lb-f, or at least about 200 lb-f, as measured using ASTM D3654 (as modified herein) or any other suitable test method. After about 7 or 14 days of exposure to water vapor (e.g., 100% relative humidity), the shear strength of the adhesive may be at least about 90 lb-f, for example, at least about 100 lb-f, at least about 106 lb-f, at least about 111 lb-f, at least about 110 lb-f, at least about 120 lb-f, at least about 130 lb-f, at least about 140 lb-f, or at least about 150 lb-f, as measured using ASTM D3654 (as modified herein) or any other suitable test method. After about one day, about 7 days, or about 14 days of exposure to water vapor (e.g., 100% relative humidity), the decrease in shear strength may less than about 35%, for example, less than about 30%, less than about 29.8%, less than about 25.9%, less than about 25%, less than about 20%, less than about 15%, less than about 10%, or less than about 5%. In some examples, there may be no loss of adhesion or there may be an increase in adhesion after being exposed to water vapor for the specified amount of time.

As another example, after about one day of exposure to high alkaline vapor (e.g., pH of 12), the shear strength of the adhesive may be at least about 150 lb-f, at least 154 lb-f, at least 155 lb-f, at least about 160 lb-f, at least about 170 lb-f, at least about 180 lb-f, at least about 190 lb-f, or at least about 200 lb-f, as measured using ASTM D3654 (as modified herein) or any other suitable test method. After about 7 or 14 days of exposure to high alkaline vapor (e.g., pH of 12), the shear strength of the adhesive may be at least about 90 lb-f, for example, at least about 100 lb-f, at least about 110 lb-f, at least about 114 lb-f, at least about 117 lb-f, at least about 120 lb-f, at least about 130 lb-f, at least about 140 lb-f, or at least about 150 lb-f, as measured using ASTM D3654 (as modified herein) or any other suitable test method. After about one day, about 7 days, or about 14 days of exposure to high alkaline vapor (e.g., pH of 12), the decrease in shear strength may less than about 35%, for example, less than about 30%, less than about 25%, less than about 24.1%, less than about 22%, less than about 20%, less than about 15%, less than about 10%, or less than about 5%. In some examples, there may be no loss of adhesion or there may be an increase in adhesion after being exposed to water vapor for the specified amount of time.

The adhesive component of the system may be provided in a variety of different ways and/or may be provided using various carriers or vehicles, some of which are described herein.

In one embodiment, the adhesive may comprise a portion of a fastener, for example, an adhesive tape. The fastener, for example, tape, may generally be operative for maintaining the tiles in a connected or joined condition, even when the tiles are installed in an adverse installation environment, as described above.

The tape may generally include a plurality of layers in a superposed, facing relationship with one another. The tape may have a first side (e.g., face or surface) of the tape is for being in contact with the bottom surface (i.e., underside) of one or more tiles, and a second side (e.g., face or surface) of the tape is for being proximate to the floor (e.g., in contact with the floor or any underlayment disposed on the floor).

For example, in a first embodiment, the tape may comprise a single-sided adhesive tape, in which the adhesive (e.g., adhesive material) is disposed or supported on one side (e.g., a first, tile contacting side) of a substrate. In use, the tape may be positioned so that adhesive side of the tape is facing upwardly with the adhesive in contact with the underside (i.e., the backing) of the tiles. The tape may generally span across at least one seam between two or more tiles (or at the abutting corners of two or more tiles, for example, four tiles) to connect or join the tiles to one another to provide sufficient stability to withstand normal foot traffic without adhering the tile to the underlying surface. The adjoined tiles generally serve as a unitary textile or "rug" that "floats" on the floor, such that the adjoined tiles may be collectively repositioned on the floor. Further, when needed or desired, one or more individual tiles may be repositioned, replaced, reconfigured, or otherwise altered without causing damage to the surface of the floor.

The adhesive may comprise any suitable adhesive, such as those described above. The level of adhesion may be semi-permanent (releasable with some effort) or non-permanent (i.e., readily releasable), such that the adhesive is sufficiently strong to adhere the tape to the backing of the tile, but not so strong that the tape cannot be separated from the tile and/or repositioned without destruction or delamination of the tape (i.e., the loss of adhesion between the adhesive and the substrate). In other embodiments, the level of adhesion may be permanent (not releasable).

The adhesive material may be a substantially continuous layer, or may be a discontinuous layer (e.g., a random or non-random pattern of adhesive). In this and other embodiments, the adhesive may have any suitable coat weight or thickness, for example, from about 0.25 mil to about 5 mil, for example, from about 1 mil to about 4 mil, for example, from about 2.5 mil to about 3.5 mil. However, other suitable thicknesses and ranges thereof may be used.

In this and other embodiments, the substrate may generally comprise a polymer film, paper, foil, or any other suitable material. In one exemplary embodiment, the substrate may comprise a polyester film (e.g., polyethylene terephthalate). In other embodiments, the substrate may comprise thermoplastic polyurethane, polyvinyl butyral, poly(trimethylene terephthalate), polystyrene, polylactic acid, ethylene vinyl acetate, polyvinyl chloride, thermoplastic polyolefin or other polyolefin, polyvinylidene chloride, and/or polypropylene. Countless other possibilities are contemplated. Further, the substrate may have any suitable thickness, for example, from about 0.25 mil to about 7 mil, for example, from about 1 mil to about 5 mil, for example, from about 3 mil to about 4 mil, for example, about 3.5 mil. However, other suitable thicknesses and ranges thereof are contemplated.

Thus, in one exemplary embodiment, the tape may comprise about 2.5 mil silicone adhesive disposed on an about 4 mil polyester film substrate. In another exemplary embodiment, the tape may comprise about 3.5 mil silicone adhesive disposed on an about 4 mil polyester film substrate. However, numerous variations are contemplated.

In general, the substrate should have a tensile strength that is sufficient to resist stretching under typical loads. In one example, the substrate may have a tensile strength of from about $20 \times 10^3$ (or 20,000) lb/sq. in to about $40 \times 10^3$ (or 40,000) lb/sq. in, for example, from about $25 \times 10^3$ (or 25,000) lb/sq. in to about $32 \times 10^3$ (or 32,000) lb/sq. in, for example, about $27 \times 10^3$ (or 27,000) lb/sq. in of force as measured using ASTM D882. However, other possibilities are contemplated.

In another exemplary embodiment, the tape of the first embodiment may include a slip resistant material on a second, floor-contacting side of the tape. The slip resistant material may generally be operative for preventing movement of the tape (and any carpet tiles joined to the tape) on the installation surface, so the carpet tiles remain substantially in position without the need for a permanent adhesive, even in adverse installation conditions. While the weight of the carpet tiles (and any items placed on the tiles) may provide sufficient resistance to undesired movement of the adjoined tiles, it is contemplated that additional slip resistance may desirable in some installations.

The slip resistant material may have any suitable composition. Suitable slip resistant materials may generally be characterized as having a sufficiently high coefficient of friction so that a carpet tile positioned on a flooring surface resists lateral movement when subjected to foot traffic, but also does not substantially adhere to the flooring surface. For example, suitable slip resistant materials may have a coefficient of friction of at least about 0.5, at least about 0.6, at least about 0.7, or at least about 0.8. The slip resistant material should also generally resist picking up dirt or other substances from the flooring surface that may impede the slip resistance of the carpet tile. In this manner, the carpet tiles remain in position during normal use, but can be readily lifted from the flooring surface and repositioned repeatedly without a substantial decrease in slip resistance. Further, in some embodiments, the slip resistant coating may be able to be wiped off or rinsed to remove any minimal debris or particulate before drying and replacing the carpet tile.

Examples of materials that may be suitable include, but are not limited to, a low-tack, non-permanent adhesive (such as those described above), a natural or synthetic polymeric material having a sufficiently high coefficient of friction (such as, for example, polyolefin coatings, natural rubber coatings, acrylic coatings, any other suitable material, or any combination thereof), a protective material, a foam or other cushioning material, any other suitable material, or any combination of materials. Any such material ideally should also be able to withstand any adverse conditions in which the tape is installed.

The slip resistant material may be continuous or discontinuous and may be disposed on all or a portion of the backing. In some embodiments, a primer (where needed) may be disposed between the slip resistant material and the backing.

In yet another exemplary embodiment, the adhesive may be disposed on the second, floor contacting side of the tape, and the slip resistant (e.g., non-skid or similar material) may be disposed on the first, tile-contacting side of the tape. The slip resistant material may comprise any suitable material operative for restricting the motion of the tile relative to the tape and to any other tile that the tape is in contact with (i.e., any adjoined tile), such as those described in connection with the second embodiment. Any such material ideally should also be able to withstand any adverse conditions in which the tape is installed. In this example, the tape could be positioned along the seams or may be spaced from the seams beneath the tile.

In still another exemplary embodiment, the tape may comprise a double-sided adhesive tape, in which adhesive is disposed on both the first side and the second side of the substrate. The adhesive on each side may be the same or may differ, as needed for a particular application. For example, the peel strength and/or shear strength of the adhesive in contact with the tile may be greater than the peel strength and/or shear strength of the adhesive in contact with the floor. As another example, the peel strength and/or shear strength of the adhesive in contact with the tile may be less than the peel strength and/or shear strength of the adhesive in contact with the floor. The adhesive in contact with the floor may be permanent, semi-permanent, or may be non-permanent, so that the tiles can be removed and/or repositioned without damaging the floor. The tape may be positioned along the seams or may be spaced from the seams beneath the tile.

It will be appreciated that the above embodiments are exemplary only, and that various other embodiments contemplated by this disclosure may have fewer or more layers, as needed for a particular application.

Examples of tapes that may be suitable in forming any of the above embodiments include, but are not limited to (the values of noted properties being approximate):

SR336R release coated polyester silicone tape (2.5 mil silicone-based adhesive on 3 mil release coated polyester film) (commercially available from Specialty Tapes Manufacturing, Franksville, Wis.), Tesa 50600 polyester tape with silicone-based adhesive (3.1 mils total thickness, 36.5 oz/in. 180 degree peel to steel, 110% elongation, 41.1 lb/in tensile strength, as provided by the manufacturer) (commercially available from Tesa SE) (to express the tensile strength in lb/sq. in, divide 41.1 by the thickness of the film in inches).

ARclad 6370 polyester tape with silicone-based adhesive (2.7-3 mil silicone-based adhesive on 1 mil polyester film, for a total thickness of 3.7-4 mil) (commercially available from Adhesives Research, Glen Rock, Pa.), and SC-4075 polyester tape with silicone-based adhesive (1.5 mil silicone-based adhesive on 2 mil polyester film, for a total thickness of 3.5 mil, having 40 oz/in. 180 degree peel to steel, 170% elongation, 55 lb/in tensile strength, as provided by the manufacturer) (commercially available from Custom Adhesive Products, Racine, Wis.) (to express the tensile strength in lb/sq. in, divide 55.5 by the thickness of the film in inches).

If desired, the tape may be provided with a release liner on one or both sides of the tape, for example, where one or both of layers comprise an adhesive or tacky material. Although countless materials may be used for such liners, in one exemplary embodiment, one or both liners may comprise a coated paper, for example, a polyolefin or fluoropolymer coated paper. In still other examples, one or both of release liners may comprise a polymer film with or without a release coating, for example, a PET film coated with a fluoropolymer. Alternatively still, one or both of release liners may be omitted in some embodiments.

The tape may be provided in any suitable manner or configuration. In one embodiment, the tape may be wound into a roll. The tape may be provided with one or more release layers, as described above, or may be self-wound, such that no release layer is used. In one example, the tape may be self-wound using an untreated polyester film substrate. In another example, the tape may be self-wound using a release treated polymer film substrate.

The tape may be provided with areas of weakening, for example, lines of perforation or scoring that facilitate separation of pieces of tape having predetermined dimensions.

In another embodiment, the tape may be provided in the form of a sheet. The sheet may include one or more release layers, as described above. The sheet may be provided with areas of weakening in the tape and/or release layer(s), for example, lines of perforation or scoring that facilitate separation of the sheet into pieces of tape having predetermined dimensions.

In still another embodiment, the tape may be pre-cut into pieces having specified dimensions. Such pieces may have any suitable shape, for example, circles, rectangles, squares, crosses, and so on. The tape pieces may be provided with one or more release layers, as described above, or may be configured without a release layer.

In yet another embodiment, the tape may be at least partially pre-joined to the carpet tiles. For example, sheets or disks of tape may be at least partially attached to a modular flooring tile using pressure, adhesive, ultrasonic frequency welding, radio frequency welding, heat, electron beam radiation, UV radiation, laser, or plasma treatment.

In still another embodiment, the substrate may be provided in any wound, sheet, pre-cut, and/or pre-attached form, and the adhesive and/or slip resistant material(s) may be applied or formed in situ using a brush, roller, spray bottle, squeeze tube, hand-held mixing unit, gun, or any suitable device or technique, as the carpet tiles are installed.

In another embodiment, the adhesive may be self-supporting or self-supported (i.e., unsupported), such that it does not need to be supported or mounted on a polymer film or other substrate in use (the adhesive may be provided on a temporary carrier sheet as a means of providing it to the user). The self-supported adhesive fastener may generally comprise a double-sided adhesive, with one side or portion that contacts the underside of the carpet tile, and one side or portion that contacts the installation. Any suitable adhesive may be used, such as those described above. Both sides of the unsupported adhesive fastener may comprise the same material or different materials and/or may have different levels of tackiness or adhesion.

The self-supported adhesive fastener may have a rectangular shape, circular or "dot" shape, oval shape, zigzag shape, or any other suitable shape or configuration. The self-supported adhesive may be for use with one tile or more than one tile, so that the self-supported adhesive may be used to join the carpet tile to the installation surface, and optionally to one another (e.g., by extending across the seams or corners of adjacent carpet tiles). Any number and/or configuration of such fasteners may be used, depending on the size and shape of the fastener. In one example, the adhesive may comprise dots having a diameter of from about 0.25 to about 2 in., for example, from about 0.5 to about 1 in. However, countless other possibilities are contemplated. A release liner may be provided to protect the adhesive.

In still another embodiment, the adhesive may be provided as a pre-applied coating on all or a portion of the tile backing. Any suitable adhesive may be used, such as those described above. While countless possibilities are contemplated, in some embodiments, the dry coat weight may be from 0.25 oz/sq yd to 5 oz/sq yd, for example, from about 1.5 to 2 oz/sq yd. If desired, a release liner may be provided to protect the adhesive.

The present invention may be understood further in view of the following examples, which are not intended to be limiting in any manner. All values are approximate unless noted otherwise. When a sample was not tested, the data is represented in the tables with "NT". When a product could not be tested due to failure or otherwise, the data is represented in the tables with an asterisk (*).

Example 1

The dimensional stability of various carpet tile backings was evaluated under various adverse conditions. Three types of backings were evaluated: (1) Ethos® PVB carpet tile backing (Tandus Flooring, Inc.), (2) ER3® PVC carpet tile backing (Tandus Flooring, Inc.), and (3) modified ER3® PVC carpet tile backing (made with alternate recycled carpet content) (Tandus Flooring, Inc.).

The backings were cut into about 2 in.×2 in. squares. The weight and thickness of each sample was recorded. The experimental samples were subjected to the Water Immersion Test n=5), Water Vapor Exposure Test (n=4), High Alkaline Immersion Test (n=4), and High Alkaline Vapor Exposure Test (n=4), as follows:

High Alkaline Immersion Test/Water Immersion Test: Samples were placed into an about 12.75 in.×11.5 in.×5 in. container. The container was filled with about 2 in. of either (1) a solution having a pH of about 12 (prepared by dissolving sodium hydroxide in tap water) (for the high alkaline immersion test), or (2) water (for the water immersion test). The container was filled with sufficient liquid to cover the samples. The samples were weighed down using an about 9.75 in.×1.75 in.×0.16 in. piece of aluminum. The container was then covered tightly with plastic wrap. The container was kept at ambient temperature during testing.

High Alkaline Vapor Exposure Test/Water Vapor Exposure Test: Large sponges (about 7.5 in.×5 in.×2 in.) were placed inside an about 12.75 in.×11.5 in.×5 in. container. The container was filled with about 2 in. of either (1) a solution having a pH of 12 (prepared by dissolving sodium hydroxide in tap water) (for the high alkaline vapor exposure test), or (2) water (for the water vapor exposure test). Samples were placed on top of the sponges to prevent any direct contact with the liquid. The container was then covered tightly with plastic wrap. The container was kept at ambient temperature during testing. Due to the large amount of condensation on the plastic covering film, the relative humidity within the container is believed to be 100%.

The control samples (n=2) were maintained at ambient conditions. The weight of each sample was measured after 1, 7, and 14 days of exposure, after which the sample was returned to its respective test environment for further evaluation. The results (averages) are presented in Tables 1-3. Comparative date for the various backings after exposure to each adverse condition is presented in Tables 4-7. In general, dimensionally stable materials may exhibit no more than about 10% loss in mass, and no more than about 5% gain in mass. However, it is contemplated that some materials may fall outside of this range and still be dimensionally stable.

TABLE 1

Dimensional stability of Ethos ® PVB carpet tile backing

| Test | Initial g | 1 day g | 1 day % Δ | 7 days g | 7 days % Δ | 14 days g | 14 days % Δ |
|---|---|---|---|---|---|---|---|
| Control | 7.6 | 7.7 | 1.2 | 7.7 | 2.1 | 7.7 | 2.2 |
| Water immersion | 8.7 | 8.8 | 1.5 | 9.0 | 2.7 | 8.9 | 2.5 |
| Water vapor | 7.7 | 7.8 | 1.2 | 7.9 | 2.1 | 7.8 | 1.5 |
| pH 12 immersion | 7.8 | 7.9 | 1.5 | 8.0 | 3.0 | 8.1 | 3.7 |
| pH 12 vapor | 7.6 | 7.7 | 1.2 | 7.7 | 2.1 | 7.7 | 2.2 |

TABLE 2

Dimensional stability of ER3 ® PVC carpet tile backing

| Test | Initial g | 1 day g | 1 day % Δ | 7 days g | 7 days % Δ | 14 days g | 14 days % Δ |
|---|---|---|---|---|---|---|---|
| Control | 8.6 | 8.6 | 0.0 | 8.7 | 0.1 | 8.6 | −0.1 |
| Water immersion | 8.5 | 8.7 | 1.7 | 8.9 | 4.7 | 9.1 | 6.7 |
| Water vapor | 8.4 | 8.5 | 0.8 | 8.6 | 2.0 | 8.5 | 1.0 |
| pH 12 immersion | 8.4 | 8.5 | 2.0 | 8.8 | 5.6 | 9.0 | 7.8 |
| pH 12 vapor | 8.5 | 8.5 | 0.6 | 8.7 | 2.6 | 8.8 | 3.8 |

TABLE 3

Dimensional stability of modified ER3 ® PVC carpet tile backing

| Test | Initial g | 1 day g | 1 day % Δ | 7 days g | 7 days % Δ | 14 days g | 14 days % Δ |
|---|---|---|---|---|---|---|---|
| Control | 9.1 | 8.8 | −3.7 | 9.1 | 0.1 | 9.1 | −0.1 |
| Water immersion | 9.0 | 9.2 | 2.3 | 9.6 | 7.3 | 9.9 | 10.8 |
| Water vapor | 9.1 | 9.2 | 1.0 | 9.4 | 2.8 | 9.3 | 2.1 |
| pH 12 immersion | 9.4 | 9.7 | 2.8 | 10.2 | 8.0 | 10.6 | 12.0 |
| pH 12 vapor | 9.3 | 9.4 | 1.1 | 9.6 | 3.1 | 9.7 | 4.2 |

TABLE 4

Dimensional stability of various backings after immersion in water

| Backing | Initial g | 1 day g | 1 day % Δ | 7 days g | 7 days % Δ | 14 days g | 14 days % Δ |
|---|---|---|---|---|---|---|---|
| Ethos ® PVB | 8.7 | 8.8 | 1.5 | 9.0 | 2.7 | 8.9 | 2.5 |
| ER3 ® PVC | 8.5 | 8.7 | 1.7 | 8.9 | 4.7 | 9.1 | 6.7 |
| Modified ER3 ® PVC | 9.0 | 9.2 | 2.3 | 9.6 | 7.3 | 9.9 | 10.8 |

As shown in Table 4, the PVB backing showed some initial increase in mass after 7 days of immersion in water, but leveled out afterwards. In sharp contrast, the PVC backings continued to increase in mass over time, which typically leads to curling of the backing, and subsequent failure of the installation.

TABLE 5

Dimensional stability of various backings after immersion in pH 12 solution

| Backing | Initial g | 1 day G | 1 day % Δ | 7 days g | 7 days % Δ | 14 days g | 14 days % Δ |
|---|---|---|---|---|---|---|---|
| Ethos ® PVB | 7.8 | 7.9 | 1.5 | 8.0 | 3.0 | 8.1 | 3.7 |
| ER3 ® PVC | 8.4 | 8.5 | 2.0 | 8.8 | 5.6 | 9.0 | 7.8 |
| Modified ER3 ® PVC | 9.4 | 9.7 | 2.8 | 10.2 | 8.0 | 10.6 | 12.0 |

As indicated in Table 5, the PVB backing showed very little initial increase in mass after 14 days of immersion in water. In sharp contrast, the PVC backings showed a sharp increase in mass after 7 days and continued to increase in mass at 14 days. Overall, the PVB sample absorbed significantly less pH 12 solution than the PVC samples.

TABLE 6

Dimensional stability of various backings after exposure to water vapor

| Backing | Initial g | 1 day g | 1 day % Δ | 7 days g | 7 days % Δ | 14 days g | 14 days % Δ |
|---|---|---|---|---|---|---|---|
| Ethos ® PVB | 7.7 | 7.8 | 1.2 | 7.9 | 2.1 | 7.8 | 1.5 |
| ER3 ® PVC | 8.4 | 8.5 | 0.8 | 8.6 | 2.0 | 8.5 | 1.0 |
| Modified ER3 ® PVC | 9.1 | 9.2 | 1.0 | 9.4 | 2.8 | 9.3 | 2.1 |

As shown in Table 6, the percent change in mass was similar for each of the three samples. This is not entirely unexpected due to the relatively short duration of the test and the relatively low mass of water vapor the samples were exposed to. However, it is noted that even with this relatively low increase in mass, the PVC samples curled upwardly, while the PVB backing samples remained flat.

TABLE 7

Dimensional stability of various backings after exposure to pH 12 vapor

| Backing | Initial g | 1 day g | 1 day % Δ | 7 days g | 7 days % Δ | 14 days g | 14 days % Δ |
|---|---|---|---|---|---|---|---|
| Ethos ® PVB | 7.6 | 7.7 | 1.2 | 7.7 | 2.1 | 7.7 | 2.2 |
| ER3 ® PVC | 8.5 | 8.5 | 0.6 | 8.7 | 2.6 | 8.8 | 3.8 |
| Modified ER3 ® PVC | 9.3 | 9.4 | 1.1 | 9.6 | 3.1 | 9.7 | 4.2 |

As indicated in Table 7, the PVB backing showed very little initial increase in mass after 14 days of immersion in water. The PVC backings exhibited a greater increase in mass after 14 days. The PVC samples also curled upwardly during the test, while the PVB backing samples remained flat.

Example 2

The dimensional stability of various carpet tiles was evaluated using International Standard ISO 2551 ("Machine made textile floor coverings—Determination of dimensional changes due to the effects of varied water and heat conditions") (also referred to as the "Aachen test"), in which the samples are heated in a 140° F. oven for 2 hours, submerged in water for 2 hours, then heated in a 140° F. oven again for 2 hours. Before and after testing according to ISO 2551, the samples were also evaluated for planar stability, which entails taking eight measurements of the distance the tile is offset from a horizontal surface, averaging the results, and rating the results according to the following scale:

0=flat 0.001-0.078=4 curl/6 dome 0.079-0.156=3 curl/7 dome 0.157-0.234=2 curl/8 dome 0.235 or more=1 curl/9 dome The target for the planar stability test is less than or equal to 0.078 in.

Ethos® PVB backed carpet tile (Tandus Flooring, Inc.) (n=100) was evaluated. The results were averaged, as presented in Table 8. The Ethos® PVB backed carpet tile samples remained substantially flat, even after being subjected to adverse conditions.

TABLE 8

Dimensional changes and planar stability of Ethos ® PVB backed carpet tile

| ISO 2551 (Δ in.) | | | | | | Planar stability | | | |
|---|---|---|---|---|---|---|---|---|---|
| MD | | | CD | | | Before heating in a 140° F. oven | | After heating in a 140° F. oven | |
| East | Center | West | East | Center | West | Planar | Dome/curl | Planar | Dome/curl |
| 0.01 | 0.007 | 0.002 | 0 | −0 | −0.01 | 0.071 | 6.39 | 0.031 | 5.08 |
| | Avg = 0.01 | | | Avg = 0 | | | | | |

Example 3

The dimensional stability of various carpet tile backings was evaluated under high humidity conditions using a controlled humidity chamber in which the relative humidity both below and above the sample is controlled. The samples (n=2) were exposed to both about 90 and about 97% relative humidity below the tile (in different tests) and about 50% relative humidity above the tile for at least 6 months.

Two types of carpet tiles were evaluated: (1) Ethos® PVB backed carpet tile (Tandus Flooring, Inc.), and (2) ER3® PVC backed carpet tile (Tandus Flooring, Inc.). The Ethos® PVB backed carpet tile exhibited no planar curling, while the ER3® PVC backed carpet tile began to show planar curling (e.g., curl of greater than 0.078 in. per the planar stability test set forth in Example 2) after 3 to 7 days.

Example 4

The dimensional stability of various carpet tile backings was evaluated using a simulated wet floor test in which a metal tray is filled with tap water and sponges are placed in the water bath so that they are about half submerged. The samples are seated on the wet sponge, but are not in contact with the water bath so that the relative humidity was about 100%. The water level is refilled daily to the same level to overcome loss by evaporation. The samples (n=2) are observed over a period of 134 days.

Three types of carpet tiles were evaluated: (1) Ethos® PVB backed carpet tiles (Tandus Flooring, Inc.), (2) ER3® PVC backed carpet tiles (Tandus Flooring, Inc.), and (3) GlasBac® PVC backed carpet tiles. The Ethos® PVB backed carpet tiles exhibited no planar curling after 134 days. In sharp contrast, the ER3® PVC backed carpet tiles began to curl within 4 to 30 days and the GlasBac® PVC backed carpet tile began to show planar curling within 2 days.

Example 5

The adhesive tack of various adhesive tapes was evaluated after exposure to various adverse conditions. Two adhesive tapes were evaluated: (1) SR336R release coated polyester silicone tape (2.5 mil silicone-based adhesive on 3 mil release coated polyester film) (commercially available from Specialty Tapes Manufacturing, Franksville, Wis.), and (2) Tactiles™ carpet tile tape pieces (believed to be an acrylic adhesive on a polyester film) (commercially available from Interface, Inc.). Additionally, Hauthane L2183 urethane-based adhesive with 1.5 wt % XR 5508 crosslinker (commercially available from Stahl, Peabody, Mass.) was coated directly onto the back of Ethos PVB with a #15 Meyer rod and evaluated.

The samples were subjected to the Water Immersion Test (n=3), Water Vapor Exposure Test (n=3), High Alkaline Immersion Test (n=3), and High Alkaline Vapor Exposure Test (n=3), as described above in Example 1. The control samples (n=3) were maintained at ambient conditions. To prevent the contact of the adhesive layer of tape with any surface, the tape was bent into a cylindrical shape with adhesive layer inside, and the extreme outer edge was adhered to the inside of a tongue depressor (about 6 in.×0.75 in).

After 1, 7, and 14 days of exposure, the adhesive tack of each sample was measured according to ASTM D2979-01 (2009) and the results were averaged. For the tape samples, the Instron probe was set to compress at a rate of 10 mm/sec until a force of 0.001 KN was reached. The resultant pressure was held constant for 1.0 sec, and the probe was then extended away from the sample at a rate of 10.008 mm/sec. For the Hauthane L2183, the Instron probe was set to compress at a rate of 10 mm/sec until a force of 0.45 KN. The resultant pressure was held constant for 10 sec, and the probe was then extended away from the sample at a rate of 10.008 mm/sec. The results are presented in lb-f. (To convert to lb-f/sq. in, divide lb-f by 0.66 sq in., which was the area of the probe. For example, an adhesive tack of about 1.3 lb-f corresponds to about 2.0 lb-f/sq in., an adhesive tack of about 1.5 lb-f corresponds to about 2.7 lb-f/sq in., an adhesive tack of about 2.3 lb-f corresponds to about 3.5 lb-f/sq in., and an adhesive tack of about 5 lb-f corresponds to about 7.6 lb-f/sq in.)

The effect of plasticizer migration was also evaluated for the Hauthane L2183 sample by placing the sample in a 140° F. oven for 1 day.

The results are presented in Tables 9-11. Any observations regarding edge crawl (i.e., the progressive weakening of the adhesive from the outer edges of the adhesive tape inwardly and/oozing from the weakened areas) were also noted.

TABLE 9

Adhesive tack of SR336R tape

| | Initial | 1 day | | 7 days | | 14 days | |
|---|---|---|---|---|---|---|---|
| Test | lb-f | lb-f | % Δ | lb-f | % Δ | lb-f | % Δ |
| Control | 5.0 | 7.6 | 53.5% | 5.9 | 18.7% | 6.5 | 30.8% |
| Water immersion | 5.0 | 5.5 | 11.3% | 5.3 | 6.6% | 3.6 | −27.6% |
| Water vapor | 5.0 | 7.7 | 54.9% | 5.1 | 2.6% | 5.4 | 8.7% |
| pH 12 immersion | 5.0 | 3.2 | −34.8% | 5.0 | 0.6% | 1.6 | −67.8% |
| pH 12 vapor | 5.0 | 5.0 | 0.6% | 6.4 | 28.8% | 5.3 | 6.6% |

TABLE 10

Adhesive tack of Hauthane L2183 adhesive on Ethos ® PVB tile

| Test | Initial lb-f | 1 day lb-f | 1 day % Δ | 7 days lb-f | 7 days % Δ | 14 days lb-f | 14 days % Δ |
|---|---|---|---|---|---|---|---|
| Control | 10.6 | 8.1 | −23.6 | 8.5 | 19.8 | NT | NT |
| Water immersion | 10.6 | 2.4 | −77.4 | 4.1 | 61.3 | NT | NT |
| Water vapor | 10.6 | 9.1 | −14.2 | 6.1 | 42.5 | NT | NT |
| pH 12 immersion | 10.6 | 2.7 | −74.5 | 4.1 | 61.3 | NT | NT |
| pH 12 vapor | 10.6 | 8.8 | −17.0 | 8.2 | 22.6 | NT | NT |
| 140° F. oven | 10.6 | 5.4 | 49.1 | NT | NT | NT | NT |

TABLE 11

Adhesive tack of Tactiles ™ tape

| Test | Initial lb-f | 1 day lb-f | 1 day % Δ | 7 days lb-f | 7 days % Δ | 14 days lb-f | 14 days % Δ |
|---|---|---|---|---|---|---|---|
| Control | 2.3 | 2.4 | 6.6 | NT | NT | NT | NT |
| Water immersion | 2.3 | 1.3 | −42.8 | * | * | * | * |
| Water vapor | 2.3 | 2.2 | −3.9 | NT | NT | NT | NT |
| pH 12 immersion | 2.3 | 1.5 | −32.8 | * | * | * | * |
| pH 12 vapor | 2.3 | 2.4 | 6.1 | NT | NT | NT | NT |

No edge crawl was observed for any of the SR336R tape tests. Thus, it would be expected that the SR336R tape would withstand adverse conditions over time. However, the Tactiles™ tape samples exhibited substantial edge crawl and were not able to be tested using the water immersion test or pH 12 immersion test after 1 day because the adhesive delaminated from the backing.

Example 6

The lap shear strength of various modular carpet (i.e., carpet tile) systems was evaluated after exposure to various adverse conditions. Two systems were evaluated: (1) SR336R release coated polyester silicone tape (2.5 mil silicone-based adhesive on 3 mil release coated polyester film) (commercially available from Specialty Tapes Manufacturing, Franksville, Wis.) joined to Ethos® PVB backed carpet tile (Tandus Flooring, Inc.), and (2) Tactiles™ carpet tile tape pieces (believed to be an acrylic adhesive on a polyester film) (commercially available from Interface, Inc.) joined to a PVC backing (commercially available from Tandus Asia). (PVC backing was used in this instance because it is believed that the Tactiles™ tape pieces are sold in connection with PVC-backed tiles.) The SR336R release coated polyester silicone tape and Tactiles™ carpet tile tape pieces were also evaluated on steel plates.

To prepare the tape-steel samples, a steel plate (3.5 in.×6 in.) was cleaned with isopropyl alcohol. An about 3 in.×4 in. tape sample was then placed on the steel so that about 2 in. of the tape was in contact with the steel, and the remainder of the tape was not in contact with any surface. Pressure was applied (about 1.75 lb) to the area in which the tape was in contact with the substrate. The tape-carpet samples were prepared in a similar manner, except that an about 3 in.×4 in. piece of carpet was used instead of a steel plate. The tape was adhered to the backing of the carpet.

The samples were subjected to the Water Immersion Test (n=3), Water Vapor Exposure Test (n=3), High Alkaline Immersion Test (n=3), and High Alkaline Vapor Exposure Test (n=3), as described above in Example 1. The control samples (n=3) were maintained at ambient conditions. After 1, 7, and 14 days of exposure, the lap shear strength of each sample was measured according to ASTM D3654/D3654M-06(2011), except that the force to failure (in lb-f) was recorded instead of time to failure. The results were averaged and are presented in Tables 12 and 13. The results are presented in lb-f. (To convert to lb-f/sq. in, divide lb-f by 6 sq in. (the contact area with the sample). For example, a lap shear value of about 130 lb-f corresponds to about 21.7 lb-f/sq in., a lap shear value of about 150 lb-f corresponds to about 25 lb-f/sq in., a lap shear value of about 163 lb-f corresponds to about 27.2 lb-f/sq in., and a lap shear value of about 200 lb-f corresponds to about 33.3 lb-f/sq in.) Any observations regarding edge crawl were also noted.

TABLE 12

Lap shear strength of SR336R tape/Ethos ® backing

| Test | Initial lb-f | 1 day lb-f | 1 day % Δ | 7 days lb-f | 7 days % Δ | 14 days lb-f | 14 days % Δ |
|---|---|---|---|---|---|---|---|
| Control | 150 | 151 | 0.6 | 146 | −3.1 | 142 | −5.7 |
| Water immersion | 150 | 158 | 5.1 | 122 | −18.9 | 143 | −4.7 |
| Water vapor | 150 | 157 | 4.5 | 111 | −25.9 | 106 | −29.8 |
| pH 12 immersion | 150 | 158 | 5.4 | 124 | −17.8 | 117 | −22.1 |
| pH 12 vapor | 150 | 154 | 2.3 | 117 | −22.0 | 114 | −24.1 |

As will be evident from Table 12, the SR336R/Ethos® backing system showed virtually no loss in lap shear strength after being immersed in water for 14 days.

Although there was some loss in lap shear strength under the remaining tests, it will be appreciated that the nature of these tests is far more extreme than typical adverse installation conditions. (However, it will be noted that even in these extreme conditions, no edge crawl was observed.) Further, these tests may exhibit a high degree of variability under some circumstances. Finally, it will also be noted that even where there is a loss in adhesion under these extreme tests, such loss in adhesion may not be considered an adhesive failure that would render the tape or system unsuitable for use. Thus, while the absolute values of the data might not be directly indicative of actual performance, this data may be highly useful for comparison with the performance of other systems (see Tables 13-17).

TABLE 13

Lap shear strength of Tactiles ™ tape/PVC backing

| Test | Initial lb-f | 1 day lb-f | 1 day % Δ | 7 days lb-f | 7 days % Δ | 14 days lb-f | 14 days % Δ |
|---|---|---|---|---|---|---|---|
| Control | 150 | NT | NT | NT | NT | NT | NT |
| Water immersion | 150 | 109 | −27.4 | 84 | −43.9 | 112 | −25.6 |
| Water vapor | 150 | 155 | 3.9 | NT | NT | NT | NT |
| pH 12 immersion | 150 | 98 | −35.1 | 89 | −41.1 | 106 | −29.5 |
| pH 12 vapor | 150 | 197 | 31.4 | NT | NT | NT | NT |

The Tactiles™ tape samples exhibited substantial edge crawl after 1 day. Accordingly, the tests were aborted because it was believed that the samples would delaminate (Table 13).

TABLE 14

Lap shear strength for various systems after immersion in water

| | Initial | 1 day | | 7 days | | 14 days | |
|---|---|---|---|---|---|---|---|
| System | lb-f | lb-f | % Δ | lb-f | % Δ | lb-f | % Δ |
| SR336R/Ethos® | 150 | 158 | 5.1 | 122 | -18.9 | 143 | -4.7 |
| Tactiles™/PVC | 150 | 109 | -27.4 | 84 | -43.9 | 112 | -25.6 |
| SR336R/steel | 163 | 170 | 4.0 | 184 | 12.8 | 187 | 14.5 |
| Tactiles™/steel | 195 | 181 | -6.9 | 211 | 8.4 | 214 | 9.8 |

As will be evident from Table 14, the Tactiles™/PVC backing system showed significantly more loss in lap shear strength than the SR336R/Ethos® backing system.

As regards the steel plate tests, the lap shear strength values set forth above were recorded when the film substrate of the tape broke, rather than when there was an adhesive failure. Since the initial adhesion of both tapes was significantly stronger, as compared with their respectively evaluated carpet backings, it is believed that it would have taken a significantly longer period of time than 14 days to achieve an adhesive failure. Since the SR336R tape had a backing thickness of 3 mils, and the Tactiles™ tape had a backing of 4 mils, it is not surprising that that the Tactiles™/steel system appeared to outperform the SR336R/steel system. However, due to the level of edge crawl exhibited by the Tactiles™ tape (as compared with none observed with the SR336R tape), it is believed that the Tactiles™ tape would have eventually failed, while the SR336R tape would not have.

Similar observations can be made with respect to the pH 12 immersion test, as set forth in Table 15 below.

TABLE 15

Lap shear strength for various systems after immersion in pH 12 solution

| | Initial | 1 day | | 7 days | | 14 days | |
|---|---|---|---|---|---|---|---|
| System | lb-f | lb-f | % Δ | lb-f | % Δ | lb-f | % Δ |
| SR336R/Ethos® | 150 | 158 | 5.4 | 124 | -17.8 | 117 | -22.1 |
| Tactiles™/PVC | 150 | 98 | -35.1 | 89 | -41.1 | 106 | -29.5 |
| SR336R/steel | 163 | 177 | 8.7 | 194 | 18.7 | 188 | 15.3 |
| Tactiles™/steel | 195 | 182 | -6.6 | 227 | 16.6 | 218 | 12.1 |

As shown in Tables 16 and 17 below, the SR336R/Ethos® backing system exhibited no edge crawl and was able to be tested even after 14 days.

TABLE 16

Lap shear strength for various systems after exposure to water vapor

| | Initial | 1 day | | 7 days | | 14 days | |
|---|---|---|---|---|---|---|---|
| System | lb-f | lb-f | % Δ | lb-f | % Δ | lb-f | % Δ |
| SR336R/Ethos® | 150 | 157 | 4.5 | 111 | -25.9 | 106 | -29.8 |
| Tactiles™/PVC | 150 | 155 | 3.9 | NT | NT | NT | NT |

TABLE 17

Lap shear strength for various systems after exposure to pH 12 vapor

| | Initial | 1 day | | 7 days | | 14 days | |
|---|---|---|---|---|---|---|---|
| System | lb-f | lb-f | % Δ | lb-f | % Δ | lb-f | % Δ |
| SR336R/Ethos® | 150 | 154 | 2.3 | 117 | -22.0 | 114 | -24.1 |
| Tactile®/PVC | 150 | 197 | 31.4 | NT | NT | NT | NT |

Example 7

The plasticizer migration resistance of various modular carpet (i.e., carpet tile) systems was evaluated. The following tapes were evaluated: (1) SR336R release coated polyester silicone tape (2.5 mil silicone-based adhesive on 3 mil release coated polyester film) (commercially available from Specialty Tapes Manufacturing, Franksville, Wis.), (2) Hauthane L2183 urethane-based adhesive plus 1.5 wt % X5800 crosslinker (commercially available from Stahl, Peabody, Mass.) (coated directly onto the back of Ethos® PVB tile), (3) Tactiles™ carpet tile tape pieces (believed to be an acrylic adhesive on a polyester film) (commercially available from Interface, Inc.), (4) Ecosticker (commercially available from Carpet Tiles 1, Australia), (5) China White (acrylic adhesive based tape, commercially available from Shanghai ZhengHuan Adhesive Products Co., Ltd., Shanghai, China), and (6) China Yellow (acrylic adhesive based tape, commercially available from Shanghai ZhengHuan Adhesive Products Co., Ltd., Shanghai, China). Each tape was evaluated in connection with two backings: 1) Ethos® PVB carpet tile backing (Tandus Flooring, Inc.), and (2) PVC carpet tile backing (Tandus Asia).

A sample of each tape was placed on each backing. A control sample was left at room temperature, while the experimental sample was placed into an oven at 180° F. After two hours, the experimental sample was removed from the oven and allowed to cool to room temperature. The tape was then pulled away by hand from the backing. The composition of the adhesive and tape was evaluated using the following scale (where "legs" refer to strings of adhesive):

0—No change

1—Slight difference adhesive has not softened and no legs are noticeable

2—Noticeable change legs have begun to form

3—Legs are present and some adhesive has transferred from the film to the carpet 4—Adhesive transfer and delamination from film, adhesive has softened 5—Severely compromised, complete adhesive delamination, long legs, very soft adhesive For the Hauthane L2183 sample, which was coated directly onto the back of Ethos® PVB with a #15 Meyer rod, the sample was evaluated by dragging a finger across the sample. The results are presented in Table 18.

TABLE 18

Plasticizer migration resistance of various adhesive tapes

| | | Plasticizer migration resistance | | | |
|---|---|---|---|---|---|
| | | Immediate | | Aged 1 month | |
| Tape | Backing | Control | Oven | Control | Oven |
| SR336R tape | PVC | 0 | 1 | 0 | 1 |
| | Ethos ® PVB | 1 | 1 | 1 | 1.5 |
| Hauthane L2183 | Ethos ® PVB | 0 | 1 | NT | NT |
| Tactiles ™ tape | PVC | 1 | 4 | 2 | 5 |
| | Ethos ® PVB | 0 | 5 | 0 | 5 |
| Ecosticker | PVC | 0 | 3.5 | NT | NT |
| | Ethos ® PVB | 1 | 4 | NT | NT |
| China White | PVC | 0 | 4 | 3 | 4 |
| | Ethos ® PVB | 0 | 5 | 1 | 4 |
| China Yellow | PVC | 0 | 2 | 0 | 2 |
| | Ethos ® PVB | 0 | 1 | 0 | 1 |

Notably, the Tactiles™, Ecosticker, and China White tapes all exhibited rather immediate plasticization of the adhesive when attached to both PVC and PVB backed carpets. The SR336R tape exhibited virtually no plasticization, even after one month of aging in an oven.

Example 8

The plasticizer migration resistance of various modular carpet (i.e., carpet tile) systems was evaluated. The following systems were evaluated: (1) SR336R release coated polyester silicone tape (2.5 mil silicone-based adhesive on 3 mil release coated polyester film) (commercially available from Specialty Tapes Manufacturing, Franksville, Wis.) joined to Ethos® PVB carpet tile backing, and (2) Tactiles™ carpet tile tape pieces (believed to be an acrylic adhesive on a polyester film) (commercially available from Interface, Inc.) joined to a PVC carpet tile backing (commercially available from Tandus Asia).

A sample of each tape was placed on each backing. A control sample was left at room temperature, while the experimental sample was placed into an oven at 140° F. The samples were observed every 2-3 days until failure, i.e., until the adhesive is softened and the tape is readily removed from the backing. The Tactiles™ tape on PVC backing failed after about 5 days. In sharp contrast, the SR336R tape on PVB was stable for 45 days, after which the test was discontinued.

Example 9

The adhesive tack of various tapes used in connection with various backings was evaluated after exposure to high pH and moisture.

The following tapes were evaluated: (1) SR336R release coated polyester silicone tape (2.5 mil silicone-based adhesive on 3 mil release coated polyester film) (commercially available from Specialty Tapes Manufacturing, Franksville, Wis.), (2) Tactiles™ carpet tile tape pieces (believed to be an acrylic adhesive on a polyester film) (commercially available from Interface, Inc.), (3) Ecosticker (commercially available from Carpet Tile 1, Australia), (4) China White (acrylic adhesive based tape, commercially available from Shanghai ZhengHuan Adhesive Products Co., Ltd., Shanghai, China), and (5) China Yellow (acrylic adhesive based tape, commercially available from Shanghai ZhengHuan Adhesive Products Co., Ltd., Shanghai, China). Each tape was evaluated in connection with two backings: 1) Ethos® PVB carpet tile backing (Tandus Flooring, Inc.), and (2) PVC carpet tile backing (Tandus Asia).

A piece of tape was placed on a 4 in.×4 in. square piece of tile so that only about half of the tape was on the tile (the other half was not in contact with anything). The samples were then soaked in a pH 11.5 solution for 4 days. Control samples were maintained at ambient conditions. The adhesive tack of each sample was then measured according to ASTM D2979-01(2009) and the results were averaged. The results are presented in Table 19. Any observations regarding edge crawl was also noted.

TABLE 19

Adhesive tack of various adhesive tapes/backings

| | | Adhesive tack (lb-f) | | | |
|---|---|---|---|---|---|
| Tape | Backing | Control | Experimental | Δ (%) | Edge crawl |
| SR336R tape | PVC | 98.2 | 54.7 | 44.3 | none |
| | Ethos ® PVB | 150.5 | 147.9 | 1.7 | none |
| Tactiles ™ tape | PVC | 149.5 | 82.3 | 44.9 | severe |
| | Ethos ® PVB | 167.6 | 147.9 | 11.8 | slight |
| Ecosticker | PVC | 110.2 | 76.9 | 30.2 | some |
| | Ethos ® PVB | 158.1 | 141.4 | 10.6 | some |
| China White | PVC | 137.9 | 85 | 38.4 | some |
| | Ethos ® PVB | 199.7 | 146.8 | 26.5 | some |
| China Yellow | PVC | 133.7 | 61.4 | 54.1 | some |
| | Ethos ® PVB | 176.6 | 159.1 | 9.9 | some |

The SR336R tape samples exhibited virtually no edge crawl, while the Tactiles™ tape samples exhibited severe (PVC) or slight (Ethos® PVB) edge crawl, indicating that the Tactiles™ tape would likely fail over time. Similarly, the Ecosticker, China White, and China Yellow tapes all exhibited some edge crawl. Thus, such tapes would also likely fail over time.

Example 10

Various tapes were used to secure Tandus Flooring, Inc. Ethos® PVB-backed tile to a concrete floor under adverse installation conditions (about 2.2 lb/24 hr/1000 sq. ft. MVER, about 11-11.5 pH, and about 65.5% RH) in an environment subject to electric pallet jacks carrying a full payload and heavy foot traffic. Prior to installation, the floor was primed with C56 Primer, available from Tandus Flooring, Inc. The following tapes from Specialty Tapes Manufacturing were used to join the tiles to one another (with the adhesive facing upwardly):
  about 2.5 mil silicone adhesive on one side of about 4 mil polyester (PET) film;
  about 3.5 mil silicone adhesive on one side of about 4 mil polyester (PET) film;
  about 3.5 mil silicone adhesive on one side of about 3 mil polyester (PET) film; and
  about 1.5 mil silicone adhesive on about 2 mil polyester (PET) film.

All of the tapes were used to install the tiles successfully. The performance of the tape was monitored for about one year with no visible movement of tiles or loss of tape adhesion.

Example 11

Tape was used to secure Tandus Flooring, Inc. Ethos® PVB-backed tile on a concrete floor under adverse installation conditions (about 2.4 lb/24 hr/1000 sq. ft. MVER, about 9.5-10 pH, and about 86.5% RH). Prior to installation, the floor was primed with C56 Primer, available from Tandus Flooring, Inc.

The tape (obtained from Specialty Tape Manufacturers) comprised about 3.5 mil silicone adhesive on one side of an about 4 mil polyester (PET) film. The tape was provided as a 3 in. wide roll with perforations about every 3.875 in. The tape pieces were applied to the corners of adjacent tiles with the adhesive facing up. 24 in.×24 in. square tiles were used.

Tiles were kicked with standard foot pressure after the installation was complete to look for movement. Little to no movement was noted across the installation. The installation was observed for about one year with no visible movement of tiles or loss of tape adhesion.

Example 12

Tape was used to secure Tandus Flooring, Inc. Ethos® PVB-backed tile on a residential concrete floor under adverse installation conditions (about 5.1 lb/24 hr/1000 sq. ft. MVER and about 10.5 pH).

The tape was obtained from Specialty Tape Manufacturers and comprised about 3.5 mil silicone adhesive on one side of an about 4 mil PET film. The tape was supplied as a 3 in. wide roll with perforations about every 3.875 in. The tape pieces were applied to the corners of adjacent tiles with the adhesive facing up. 24 in.×24 in. square tiles were used. The installation was observed for about three months with no visible movement of tiles or loss of tape adhesion.

Example 13

Tape was used to secure Tandus Flooring, Inc. Ethos® PVB-backed tile on a concrete floor under varying and unpredictable adverse conditions (about 2.3 lb/24 hr/1000 sq. ft. MVER, about 8.5-9 pH, and about 79.3% RH). The tape was SR336R release coated polyester silicone tape (2.5 mil silicone-based adhesive on 3 mil release coated polyester film) (commercially available from Specialty Tapes Manufacturing, Franksville, Wis.). The tape was supplied as a 3 in. wide roll with perforations about every 3.875 in. The tape pieces were applied to the corners of adjacent tiles with the adhesive side facing up. 24 in.×24 in. square tiles were used. The installation was observed for about 3 months with no visible movement of the tiles or loss of tape adhesion. The installation area was in a semi-covered outdoor exposed area subject to rain and drastic swings in humidity typical of the climate in Dalton, Ga., USA.

Example 14

Tape was used to secure Tandus Flooring, Inc. Ethos® PVB-backed tile on a concrete floor under varying and unpredictable adverse conditions (about 2.4 lb/24 hr/1000 sq. ft. MVER, about 9.5-10 pH, and about 86.5% RH). The tape was 50600 Tesa release coated polyester silicone tape (commercially available from Tesa SE Tape). The tape was supplied as a 2 in wide roll. Strips were cut every 4 in. and were applied to the corners of adjacent tiles with the adhesive side facing up. 36 in.×36 in. square tiles were used. The installation was observed for about 11 months with no visible movement of the tiles or loss of tape adhesion. The installation area was subjected to heavy foot traffic during the evaluation time.

It will be readily understood by those persons skilled in the art that the present invention is susceptible of broad utility and application. It will also be recognized by those skilled in the art that various elements discussed with reference to the various embodiments may be interchanged to create entirely new embodiments coming within the scope of the present invention. While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention. Many adaptations of the present invention other than those herein described, as well as many variations, modifications, and equivalent arrangements will be apparent from or reasonably suggested by the present invention and the above detailed description without departing from the substance or scope of the present invention. Accordingly, the detailed description set forth herein is not intended nor is to be construed to limit the present invention or otherwise to exclude any such other embodiments, adaptations, variations, modifications, and equivalent arrangements of the present invention.

What is claimed is:

1. A modular carpet system, comprising:
 a first component comprising a carpet tile, the carpet tile comprising a face and a backing, wherein the backing is for being positioned in a facing relationship with an installation surface, wherein the backing comprises a polymer having at least 50% amorphous content, wherein the polymer having at least 50% amorphous content comprises polyvinyl butyral,
 wherein the carpet tile is operative for remaining dimensionally stable under adverse conditions, the adverse conditions comprising at least one of
  a moisture vapor emission rate of at least about 4 lb/24 hr/1000 sq. ft.,
  an in situ relative humidity of at least about 80%, and
  a surface moisture pH of at least about 8; and
 a second component comprising an adhesive tape piece separate from the carpet tile, wherein the adhesive tape piece is for securing the carpet tile to at least one of an adjacent carpet tile and the installation surface, wherein the adhesive tape piece comprises a pressure-sensitive adhesive supported on a polymer film, the pressure-sensitive adhesive comprising a silicone-based adhesive having a shear strength of from about 21.7 lb-f/sq.

in. to about 33.3 lb-f/sq. in., and an adhesive tack of greater than 3.5 lb-f/sq. in. prior to exposure to the adverse conditions, and the polymer film having a thickness of from about 1 mil to about 5 mil, and a tensile strength of from about 20,000 to about 40,000 lb/sq. in., wherein the adhesive tape piece is for being positioned beneath the carpet tile, so that the adhesive tape piece is disposed at least partially between the backing of the carpet tile and the installation surface, and so that the pressure-sensitive adhesive of the adhesive tape piece is in contact with the backing of the carpet tile, wherein the pressure-sensitive adhesive of the adhesive tape piece in contact with the backing of the carpet tile secures the carpet tile to the at least one of the adjacent carpet tile and the installation surface under the adverse conditions.

2. The modular carpet system of claim 1, wherein the adverse conditions comprise at least one of
a moisture vapor emission rate of at least about 5 lb/24 hr/1000 sq. ft.,
an in situ relative humidity of at least about 90%, and
a surface moisture pH of at least about 10.

3. The modular carpet system of claim 1, wherein the polymer of the backing further comprises modified polycarbonate, ultra high molecular weight polyethylene, atactic polypropylene, a silicone elastomer, a thermoplastic polyolefin, a thermoplastic elastomer, bitumen, or any combination thereof.

4. The modular carpet system of claim 1, wherein the backing further comprises a filler.

5. The modular carpet system of claim 4, wherein the backing comprises from about 25 to about 60 wt % polyvinyl butyral and from about 40 to about 75 wt % filler.

6. The modular carpet system of claim 1, wherein the backing further comprises a plasticizer.

7. The modular carpet system of claim 6, wherein the silicone-based adhesive resists being plasticized by the plasticizer after exposure to 140° F. for 30 days.

8. The modular carpet system of claim 1, wherein remaining dimensionally stable under adverse conditions comprises having a change in length or width of less than about 0.15% after being immersed in water for at least about 2 hours.

9. The modular carpet system of claim 1, wherein remaining dimensionally stable under adverse conditions comprises having a change in length or width of less than about 0.15% as measured using ISO 2551.

10. The modular carpet system of claim 1, wherein remaining dimensionally stable under adverse conditions comprises having a planar deviation of less than about 0.078 in. after being immersed in water for about 2 hours.

11. The modular carpet system of claim 1, wherein the silicone-based adhesive has an adhesive tack of about 7.6 lb-f/sq. in. prior to exposure to adverse conditions.

12. The modular carpet system of claim 1, wherein the silicone-based adhesive has an adhesive tack of greater than 2.0 lb-f/sq. in. after being immersed in water for about 1 day.

13. The modular carpet system of claim 1, wherein the silicone-based adhesive has an adhesive tack of greater than 2.7 lb-f/sq. in. after being immersed in a pH 12 solution for about 1 day.

14. The modular carpet system of claim 1, wherein the polymer film of the adhesive tape piece comprises a polyester film.

15. The modular carpet system of claim 1, wherein the adhesive tape piece exhibits substantially no delamination after exposure to adverse conditions.

16. The modular carpet system of claim 1, wherein the adhesive tape piece has a thickness of from about 2.5 mil to about 3.5 mil.

17. The modular carpet system of claim 1, wherein the adhesive tape piece has a tensile strength of from about 25,000 to about 32,000 lb/sq. in.

18. The modular carpet system of claim 1, used in an installation comprising the adhesive tape piece and the carpet tile.

19. The modular carpet system of claim 1, wherein
the carpet tile is a first carpet tile of a plurality of carpet tiles, the plurality of carpet tiles being positioned in a side by side configuration in an installation with the adhesive tape piece positioned beneath the carpet tile, and
the adhesive tape piece maintains the plurality of carpet tiles in the side by side configuration within the installation.

20. The modular carpet system of claim 1, wherein the carpet tile is secured in an installation under adverse conditions with the adhesive tape piece positioned beneath the carpet tile, wherein the adverse conditions comprise at least one of
a moisture vapor emission rate of at least about 5 lb/24 hr/1000 sq. ft.,
an in situ relative humidity of at least about 90%, and
a surface moisture pH of at least about 10, and
wherein the carpet tile resists deformation under the adverse conditions.

21. The modular carpet system of claim 1, wherein the carpet tile is secured in an installation under adverse conditions with the adhesive tape piece positioned beneath the carpet tile, wherein the adverse conditions comprise at least one of
a moisture vapor emission rate of at least about 5 lb/24 hr/1000 sq. ft.,
an in situ relative humidity of at least about 90%, and
a surface moisture pH of at least about 10, and
wherein
the carpet tile resists deformation under the adverse conditions, and
the adhesive tape piece maintains the carpet tile in the installation under the adverse conditions.

22. The modular carpet system of claim 1, wherein
the silicone-based adhesive has an adhesive tack of greater than 2.0 lb-f/sq. in. after being immersed in water for about 1 day, and
remaining dimensionally stable under adverse conditions comprises the carpet tile undergoing a change in length or width of less than about 0.15% after being immersed in water for at least about 2 hours.

23. The modular carpet system of claim 22, wherein the initial adhesive tack of the silicone-based adhesive is about 7.6 lb-f/sq. in.

24. The modular carpet system of claim 22, wherein the backing of the carpet tile comprises from about 25 to about 60 wt % polyvinyl butyral.

25. The modular carpet system of claim 22, wherein the polymer film of the adhesive tape piece comprises a polyester film.

26. The modular carpet system of claim 22, wherein
the carpet tile is a first carpet tile of a plurality of carpet tiles, the plurality of carpet tiles being positioned in a side by side configuration in an installation with the adhesive piece positioned beneath the carpet tile, and the adhesive tape piece maintains the plurality of carpet tiles in the side by side configuration within the installation.

27. The modular carpet system of claim 22, wherein the carpet tile is secured in an installation under adverse conditions with the adhesive tape piece positioned beneath the carpet tile, wherein the adverse conditions comprise at least one of a moisture vapor emission rate of at least about 5 lb/24 hr/1000 sq. ft., an in situ relative humidity of at least about 90%, and a surface moisture pH of at least about 10, and wherein the carpet tile resists deformation under the adverse conditions, and the adhesive tape piece maintains the carpet tile in the installation under the adverse conditions.

28. A modular carpet system, comprising:

a plurality of carpet tiles, the carpet tiles each comprising a face and a backing, wherein the backing is for being positioned in a facing relationship with an installation surface, wherein the backing comprises polyvinyl butyral, and wherein the carpet tile is operative for remaining dimensionally stable under adverse conditions, the adverse conditions comprising at least one of a moisture vapor emission rate of at least about 4 lb/24 hr/1000 sq. ft., an in situ relative humidity of at least about 80%, and a surface moisture pH of at least about 8; and a plurality of adhesive tape pieces, the adhesive tape pieces being for joining the carpet tile to at least one of an adjacent carpet tile and the installation surface, wherein the adhesive tape pieces comprise a silicone-based, pressure-sensitive adhesive supported on a polymer film, wherein the pressure-sensitive adhesive has a shear strength of from about 21.7 lb-f/sq. in. to about 33.3 lb-f/sq. in. prior to exposure to the adverse conditions, wherein the adhesive tape pieces are for being positioned beneath the carpet tiles during installation of the carpet tiles, so that the adhesive tape pieces are disposed between the backing of the carpet tiles and the installation surface, and so that the pressure-sensitive adhesive is in contact with the backing of the carpet tiles, wherein the pressure-sensitive adhesive in contact with the backing of the carpet tiles joins each carpet tile to the at least one of the adjacent carpet tile and the installation surface under the adverse conditions.

29. The modular carpet system of claim 28, wherein the adverse conditions comprise at least one of a moisture vapor emission rate of up to about 8 lb/24 hr/1000 sq. ft., an in situ relative humidity of up to about 85%, and a surface moisture pH of up to about 11.

30. The modular carpet system of claim 28, wherein remaining dimensionally stable comprises having at least one of:

a change in length or width of less than about 0.15% after being immersed in water for at least about 2 hours, a change in length or width of less than about 0.15% as measured using ISO 2551, and a planar deviation of less than about 0.078 in. after being immersed in water for about 2 hours.

31. The modular carpet system of claim 28, wherein the silicone-based adhesive has at least one of:

an adhesive tack of greater than 3.5 lb-f/sq. in. prior to exposure to adverse conditions, an adhesive tack of greater than 2.0 lb-f/sq. in. after being immersed in water for about 1 day, and an adhesive tack of greater than 2.7 lb-f/sq. in. after being immersed in a pH 12 solution for about 1 day.

32. The modular carpet system of claim 28, wherein the silicone-based adhesive has an adhesive tack of about 7.6 lb-f/sq. in. prior to exposure to adverse conditions.

33. The modular carpet system of claim 28, wherein the backing comprises from about 25 to about 60 wt % polyvinyl butyral.

34. The modular carpet system of claim 28, wherein the polymer film of the adhesive tape pieces has a thickness of from about 1 mil to about 5 mil, and a tensile strength of from about 20,000 to about 40,000 lb/sq. in.

35. The modular carpet system of claim 28, used in an installation comprising the adhesive tape pieces and the plurality of carpet tiles, wherein the carpet tiles are positioned in an edge to edge configuration with the adhesive tape pieces positioned beneath the carpet tiles, and the adhesive tape pieces connect adjacent tiles to one another in the edge to edge configuration in the installation.

36. The modular carpet system of claim 28, wherein the backing comprises from about 25 wt % to about 60 wt % polyvinyl butyral, the silicone-based adhesive has an initial adhesive tack of greater than 3.5 lb-f/sq. in., the silicone-based adhesive has an adhesive tack of greater than 2.0 lb-f/sq. in. after being immersed in water for about 1 day, and the carpet tile remaining dimensionally stable under adverse conditions comprises the carpet tile exhibiting a planar deviation of less than about 0.078 in. after being immersed in water for about 2 hours.

37. The modular carpet system of claim 36, wherein the backing comprises from about 40 wt % to about 75 wt % filler.

38. The modular carpet system of claim 36, wherein the polymer film of the adhesive tape pieces has a thickness of from about 1 mil to about 5 mil, and a tensile strength of from about 20,000 to about 40,000 lb/sq. in.

39. The modular carpet system of claim 36, used in an installation comprising the adhesive tape pieces and the plurality of the carpet tiles, wherein the carpet tiles are positioned in an edge to edge configuration with the adhesive tape pieces positioned beneath the carpet tiles, and the adhesive tape pieces secure the plurality of carpet tiles in the edge to edge configuration in the installation.

40. The modular carpet system of claim 28, wherein the backing further comprises a filler in an amount of from about 42 to about 65 wt % of the backing.

41. A modular carpet system, comprising:

a plurality of carpet tiles, the carpet tiles each comprising a face and a backing, wherein the backing is for being positioned in a facing relationship with an installation surface, wherein the backing comprises polyvinyl butyral, and from about 40 to about 75 wt % filler, wherein the carpet tile is operative for remaining dimensionally stable under adverse conditions, the adverse conditions comprising at least one of a moisture vapor emission rate of at least about 4 lb/24 hr/1000 sq. ft., an in situ relative humidity of at least about 80%, and a surface moisture pH of at least about 8; and a plurality of adhesive tape pieces wound into a roll, the adhesive tape pieces being separably joined to one another along lines of perforation, the adhesive tape pieces being for adhesively connecting the carpet tile to an adjacent carpet tile, wherein the adhesive tape comprises a silicone-based, pressure-sensitive adhesive on a polyester film, wherein the silicone-based, pressure-sensitive adhesive has an adhesive tack of greater than 3.5 lb-f/sq. in. prior to exposure to the adverse conditions, wherein the adhesive tape pieces are for being positioned beneath the carpet tiles during installation of the carpet tiles, so that the adhesive tape pieces are disposed between the backing of the carpet tiles and the installation surface, and so that the pressure-sensitive adhesive is in contact with the backing of the carpet tiles, wherein the pressure-sensitive adhesive in contact with the backing of the carpet tiles adhesively connects the carpet tile to the adjacent carpet tile under the adverse conditions.

42. The modular carpet system of claim 41, wherein prior to exposure to the adverse conditions, the pressure-sensitive adhesive has a shear strength of from about 21.7 lb-f/sq. in. to about 33.3 lb-f/sq. in.

43. The modular carpet system of claim 42, wherein
the pressure-sensitive adhesive has an adhesive tack of greater than 2.0 lb-f/sq. in. after being immersed in water for about 1 day, and
the carpet tile undergoes a change in length or width of less than about 0.15% after being immersed in water for at least about 2 hours.

44. The modular carpet system of claim 41, wherein the polyester film of the adhesive tape pieces has
a thickness of from about 1 mil to about 5 mil, and
a tensile strength of from about 20,000 to about 40,000 lb/sq. in.

* * * * *